(12) United States Patent
Graham et al.

(10) Patent No.: US 7,611,292 B2
(45) Date of Patent: Nov. 3, 2009

(54) OPTICAL INTERFACE IDENTIFICATION SYSTEM

(75) Inventors: Richard W. Graham, Derry, NH (US); John J. Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 12/033,811

(22) Filed: Feb. 19, 2008

(65) Prior Publication Data

US 2008/0138012 A1 Jun. 12, 2008

Related U.S. Application Data

(63) Continuation of application No. 11/269,152, filed on Nov. 8, 2005, now Pat. No. 7,347,628.

(60) Provisional application No. 60/626,002, filed on Nov. 8, 2004.

(51) Int. Cl.
G02B 6/36 (2006.01)

(52) U.S. Cl. .............................. 385/75; 385/88; 385/89

(58) Field of Classification Search .................. 385/75, 385/88–89
See application file for complete search history.

(56) References Cited

U.S. PATENT DOCUMENTS

| 4,627,052 A | 12/1986 | Hoare et al. |
| 4,734,907 A | 3/1988 | Turner |
| 4,823,338 A | 4/1989 | Chan et al. |
| 4,939,726 A | 7/1990 | Flammer et al. |
| 5,076,688 A * | 12/1991 | Bowen et al. ............... 356/73.1 |
| 5,090,025 A | 2/1992 | Marshall et al. |
| 5,095,480 A | 3/1992 | Fenner |
| 5,132,926 A | 7/1992 | MacEachern et al. |
| 5,136,580 A | 8/1992 | Videlock et al. |

(Continued)

FOREIGN PATENT DOCUMENTS

EP 1154624 11/2001

(Continued)

OTHER PUBLICATIONS

Smartronix Catalog, "SuperLooper Line" (2 pages).

(Continued)

*Primary Examiner*—Frank G Font
*Assistant Examiner*—Eric Wong
(74) *Attorney, Agent, or Firm*—Holland & Knight LLP; Brian J. Colandreo, Esq.; J. Mitchell Herbert, Jr., Esq.

(57) ABSTRACT

A connector assembly, configured to releasably couple a socket assembly, includes zero or more data conductors. An optical pathway is configured to: receive an optical signal from an optical light source positioned within the socket assembly; and provide at least a portion of the optical signal to an optical light target positioned within the socket assembly.

21 Claims, 8 Drawing Sheets

U.S. PATENT DOCUMENTS

| | | |
|---|---|---|
| 5,173,933 A | 12/1992 | Garner et al. |
| 5,243,652 A | 9/1993 | Teare et al. |
| 5,289,460 A | 2/1994 | Drake, Jr. et al. |
| 5,331,637 A | 7/1994 | Francis et al. |
| 5,355,371 A | 10/1994 | Auerbach et al. |
| 5,355,375 A | 10/1994 | Christensen |
| 5,361,256 A | 11/1994 | Doeringer et al. |
| 5,367,667 A | 11/1994 | Wahlquist |
| 5,394,402 A | 2/1995 | Ross |
| 5,396,493 A | 3/1995 | Sugiyama |
| 5,400,326 A | 3/1995 | Smith |
| 5,428,615 A | 6/1995 | Backes et al. |
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Johnson et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Botcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A | 8/2000 | Schneider et al. |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 | 4/2001 | Chintakrindi et al. |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 | 10/2001 | Goertzel et al. |
| 6,317,500 B1 | 11/2001 | Murphy |
| 6,327,474 B1 | 12/2001 | Ruutu et al. |
| 6,327,535 B1 | 12/2001 | Evans et al. |
| 6,343,317 B1 | 1/2002 | Glorikian |
| 6,352,446 B2 * | 3/2002 | Ezawa et al. ............... 439/490 |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 | 8/2002 | Inoue et al. |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 | 4/2003 | Kovacs |
| 6,556,831 B1 | 4/2003 | Buppelmann |
| 6,580,914 B1 | 6/2003 | Smith |
| 6,583,713 B1 | 6/2003 | Bates |
| 6,640,184 B1 | 10/2003 | Rabe |
| 6,640,248 B1 | 10/2003 | Jorgensen |
| 6,665,715 B1 | 12/2003 | Houri |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 | 6/2004 | Parekh et al. |
| 6,771,639 B1 | 8/2004 | Holden |
| 6,778,818 B1 | 8/2004 | O'Neil |
| 6,795,688 B1 | 9/2004 | Plasson et al. |
| 6,799,049 B1 | 9/2004 | Zellner et al. |
| 6,807,427 B1 | 10/2004 | Sakamoto et al. |
| 6,813,501 B2 | 11/2004 | Kinnunen et al. |
| 6,826,385 B2 | 11/2004 | Kujala |

| | | | |
|---|---|---|---|
| 6,826,617 | B1 | 11/2004 | Ansell et al. |
| 6,834,195 | B2 | 12/2004 | Brandenberg et al. |
| 6,859,791 | B1 | 2/2005 | Spagna et al. |
| 6,889,051 | B2 | 5/2005 | Ogino et al. |
| 6,889,053 | B1 | 5/2005 | Chang et al. |
| 6,920,329 | B2 | 7/2005 | Kennedy et al. |
| 6,934,548 | B1 | 8/2005 | Gould et al. |
| 6,937,988 | B1 | 8/2005 | Hemkumar et al. |
| 6,938,096 | B1 | 8/2005 | Greschler et al. |
| 6,983,313 | B1 | 1/2006 | Korkea-Aho |
| 6,985,731 | B1 | 1/2006 | Johnson et al. |
| 7,010,583 | B1 | 3/2006 | Aizono et al. |
| 7,089,264 | B1 | 8/2006 | Guido et al. |
| 7,120,449 | B1 | 10/2006 | Muhonen et al. |
| 7,136,915 | B2 | 11/2006 | Rieger, III |
| 7,139,829 | B2 | 11/2006 | Wenzel et al. |
| 7,197,556 | B1 | 3/2007 | Short et al. |
| 7,266,839 | B2 | 9/2007 | Bowers et al. |
| 2001/0022558 | A1 | 9/2001 | Karr, Jr. et al. |
| 2001/0039623 | A1 | 11/2001 | Ishikawa |
| 2002/0010866 | A1 | 1/2002 | McCullough et al. |
| 2002/0016831 | A1 | 2/2002 | Peled et al. |
| 2002/0023010 | A1 | 2/2002 | Rittmaster et al. |
| 2002/0034953 | A1 | 3/2002 | Tricarico |
| 2002/0046073 | A1 | 4/2002 | Indseth et al. |
| 2002/0051540 | A1 | 5/2002 | Glick et al. |
| 2002/0052180 | A1 | 5/2002 | Ravishankar et al. |
| 2002/0062379 | A1 | 5/2002 | Widegren et al. |
| 2002/0063656 | A1 | 5/2002 | Gutowski |
| 2002/0107029 | A1 | 8/2002 | Caughran et al. |
| 2002/0122055 | A1 | 9/2002 | Parupudi et al. |
| 2002/0138632 | A1 | 9/2002 | Bade et al. |
| 2002/0164996 | A1 | 11/2002 | Dorenbosch |
| 2002/0188842 | A1 | 12/2002 | Willeby |
| 2003/0035544 | A1 | 2/2003 | Herle et al. |
| 2003/0041167 | A1 | 2/2003 | French et al. |
| 2003/0065571 | A1 | 4/2003 | Dutta |
| 2003/0095509 | A1 | 5/2003 | Ramanan et al. |
| 2003/0185233 | A1 | 10/2003 | Ji et al. |
| 2003/0208523 | A1 | 11/2003 | Gopalan et al. |
| 2004/0064334 | A1 | 4/2004 | Nye |
| 2005/0199792 | A1 | 9/2005 | Argast et al. |

FOREIGN PATENT DOCUMENTS

| | | |
|---|---|---|
| WO | 94/28683 | 12/1994 |
| WO | 97/05749 | 2/1997 |
| WO | 97/41654 | 11/1997 |
| WO | 98/19482 | 5/1998 |
| WO | 00/22862 | 4/2000 |
| WO | 00/44149 | 7/2000 |
| WO | 00/67450 | 11/2000 |
| WO | 00/69198 | 11/2000 |
| WO | 01/08425 | 2/2001 |
| WO | 01/22656 | 3/2001 |
| WO | 01/69956 | 9/2001 |
| WO | 01/76093 | 10/2001 |
| WO | 01/82259 | 11/2001 |
| WO | 01/94967 | 12/2001 |
| WO | 01/95505 | 12/2001 |
| WO | 02/09456 | 1/2002 |
| WO | 02/12914 | 2/2002 |

OTHER PUBLICATIONS

"802.1 Plenary Meeting Agenda," IEEE 802.1 Meeting, LaJolla, CA, Mar. 11, 1996.
"802.1 Resolution on Progess of VLAN work," Jul. 1995, IEEE.
"802.1Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Cisco IOS VLAN Services," Cisco Systems.
"Clearpoint Demonstrates Frame Relay Support in Interop Frame Relay Solutions Showcase," Clearpoint, Press Release dated Sep. 23, 1991.
"Closing Plenary Minutes," IEEE 802.1 Meeting, LaJolla, CA, Mar. 14, 1996.
"Constellation Product Schedule," Apr. 22, 1992.
"Constellation Series" Clearpoint Research Corporation.
"Cyberlocator: A new Dimension in Network Security," retrieved from www.cyberlocator.com, Jul. 2002.
"DNS LOC: Geo-enabling the Domain System," retrieved from www.ckdhr.com/dns-loc/.
"End Station Tagging Presentation," Presentation Jun. 1996.
"Geographic Location/Privacy (geopriv)" retrieved from www.ietf.org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the Mar. 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," 0712/1995, P802.1-95/007, IEEE.
"Internet Protocol," DARPA Internet Program Protocol Specification: RFC 791, Sep. 1981, pp. 1-45.
"IP Multicast Streamlines Delivery of Multicast Applications," The Packet: Cisco Systems Use Magazine, V.7, No. 1, 1995.
"IP Packet Structure".
"ISO/TC211: Geographic Information/Geomatics Location based services possible standards," retrieved from www. isotc211.org/scope/htm.
"LAN Emulation over ATM Version 1.0," the ATM Forum Technical Committee, af-lane-0021.000, Jan. 1995, pp. 1-141.
"Location Pattern Matching & the RadioCamera Network," US Wireless 2001.
"Location Technologies for GSM, GPRS and WCDMA Networks," SnapTrack, White Paper, Nov. 2001.
"Multiprotocol Routing—From Constellation," Clearpoint Research Corporation, 1992.
"New Cisco IOS VLAN Services Make 'Virtual' a Reality," Cisco VLAN Roadmap, Dec. 9, 1996.
"Newbury Networks Debuts First Location-Enabled Networks Solutions for 802.11B WLANS," retrieved from www. newburynetworks.com/newsroom.presslist.php?start=5, Sep. 2001.
"Proposed comments on ISO/IEC 10038/PDAM 2," Jul. 12, 1995, P802.1-95/009, IEEE.
"Proposed Comments on ISO/IEC 15802-5/PDAM 1," Jul. 12, 1995, P802.1-95/010, IEEE.
"Quick VLAN Standardization," IEEE 802.1 Meeting, Ottowa, Oct. 2, 1996.
"Real Time Location Systems and Wireless Local Area Networking: Combining Technologies for Optimum Asset Visibility and Supply Chain Management," Apr. 2001.
"Reliacast to Offer Enhanced Geographic Content Distribution Management Through Partnership with Quova," Mar. 6, 2001.
"SLITHERNET: A Proposal for Using Moderate-To-High-Speed Synchronous Serial Connections as a LAN-like Networking Medium", Jul. 1991.
"SpotON: Ad-hoc Location Sensing," retrieved from www.portolano.cs.washington.edu/projects/spoton, Jul. 2002.
"TCP-IP Distribution List for Nov. 1991," The Security Digest Archives, Nov. 1991.

"The Richochet Wireless Network Overview," retrieved from http://www.ricochet.net/ricochet/, 1997.
"Virtual LAN Communications," Cisco VLAN Roadmap—White Paper, Dec. 9, 1996.
"Virtual LANs Find a Use for Selective Flooding," Network World, Apr. 10, 1995, V.12, No. 15, p. 54.
"Virtual LANs Get Real," Data Communications, Feb. 1995, pp. 87-96.
"Virtual LANs Near Reality," Data Communications, Jul. 1995, p. 16.
"VisualRoute—Visual Traceroute Utility/Locate Internet Abusers," retrieved from www.visualware.com/visualroute/ index/html, Jul. 2002.
Aggarwal, Sudhir, and Raghav, Amritansh, "Dualcast: A Scheme for Reliable Multicasting," IEEE, Apr. 1994, pp. 15-22.
Aguilar, Lorenzo, "Datagram Routing for Internet Multicasting," ACM, 1994, pp. 58-63.
Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.
Aiello, Rosario, et al., "Casual Ordering in Reliable Group Communications," ACM SIGCOMM, 1993, pp. 106-115.
Almquist, P., and Kastenholz, F., "Towards Requirements for IP Routers," Network Working Group RFC 1716 Memo, Nov. 1994, pp. 1-172.
Alonge, Ken, "Revision to SDE," Email dated Nov. 13, 1995.
Amir and Balakrishnan, "An Evaluation of the Metricom Richochet Wireless Network," U.C. Berkeley, May 1996.
Ammar, Mostafa H., "Probabilistic Multicast: Generalizing the Multicast Paradigm to Improve Scalability," College of Computing, Georgia Institute of Technology, Atlanta, GA, pp. 1-9.
Anderson, Jens Kristian, "Virtual LANs Take Network to Next Level," Computer Technology Review, Sep. 1996, pp. 12-14.
Armstrong, S., et al., "Multicast Transport Protocol," Network Working Group—RFC 1301 Memo, Feb. 1992, pp. 1-36.
Auerbach, Josh, et al., "Multicast Group Membership Management in High Speed Wide Area Networks,".
Autolitano, A., et al., "Application of Generalized Parallel Delta Networks to a Hybrid Broadband Switch," IEEE 1989, pp. 123-127.
Axner, David H., "Differing Approaches to Virtual LANs," Business Communications Review, V. 23, No. 12, Dec. 1993, pp. 42-45.
Backes, Floyd, "An Architectural Framework for VLAN Standardization in IEEE 802," IEEE Presentation, Milpitas, CA, Jan. 24, 1996.
Backes, Floyd, "Spanning Tree Bridges; Transparent Bridges for Interconnection of IEEE 802 LANs," IEEE Network, V.2, No. 1, Jan. 1988, pp. 5-9.
Bagwell, Richard T., et al., "A Comparison of Native ATM-Multicast to IP-Multicast With Emphasis on Mapping Between the Two," IEEE, 1995, pp. 189-193.
Bahl and Padmanabhan, "RADAR: An In-Building RF-based User Location and Tracking System," Proc. IEE Infocom 2000, Mar. 2000.
Bahl, Padmanabhan, and Balachandran, "A Software System for Locating Mobile Users: Design, Evaluation, and Lessons," Apr. 2000.
Bahl, Padmanabhan, and Balachandran, "Enhancements to the RADAR User Location and Tracking System," Microsoft Research Technical Report, MSR-TR-2000-12, Feb. 2000.
Balboni, Gian Paolo, et al., "An ATM Switching Testbed," Jul.-Aug. 1991.
Ballardie, Tony, et al., "Multicast-Specific Security Threats and Counter Measures," IEEE 1995, pp. 2-16.
Ballardie, Tony, et al., "Core Based Trees (CBT)—An Architecture for Scalable Inter-Domain Multicast Routing," ACM SIGCOMM, 1993, pp. 85-95.
Bament, Sally, "Why You Should Consider INPs as a Viable Internetworking Solution," Telecommunications, V.27, No. 2, Feb. 1993, pp. 54-57.
Bartlett, John, "Embedded VLAN Tagging," IEEE 802.1 Meeting Presentation, LaJolla, CA, Mar. 12, 1996.
Bartlett, John, "Media or Network Based VLANs?," IEEE 802.1 VLAN Meeting Presentation, LaJolla, CA, Mar. 12, 1996.
Barton and Kindberg, "The Challenges and Opportunities of Integrating the Physical World and Networked Systems," Hewlett Packard Laboratories, HPL-2001-18, Jan. 24, 2001.
Bennett, Geoff, "Routing in the Virtual LAN," Telecommunications, V. 29, No. 7, Jul. 1995, pp. 33, 69-72.
Bernabei, Francisco, et al., "A Fully Distributed Routing Control Scheme in an ATM Switch," IEEE, 1990, pp. 766-770.
Bichard, Jean Philippe, "Decouper le Reseau en Segments Autonomes".
Birman, Ken, "A Response to Cheriton's and Skeen's Criticism of Causal and Totally Ordered Communication," Department of Computer Science, Cornell University, Oct. 21, 1993, pp. 11-21.
Birman, Kenneth P., and Joseph, Thomas A., "Reliable Communication in the Presence of Failures," ACM Transactions on Computer Systems, V.5, No. 1, Feb. 1987, pp. 47-76.
Birman, Kenneth, et al., "Design Alternatives for Process Group Membership and Multicast," NTIS, Department of Computer Science—Cornell University, Dec. 1991, pp. 1-31.
Blazevic et al., "Self-Organization in Mobile Ad-Hoc Networks: The Approach of Terminodes," IEEE Comm. Mag. 2001.
Boggs, David Reed, "Internet Broadcasting," Dissertation—Stanford University Graduate Studies, University Microfilms International, Jan. 1982, pp. 1-86.
Bolot, Jean-Chrysostome, et al. "Scalable Feedback Control for Multicast Video Distribution in the Internet," ACM SIGCOMM, 1994, pp. 58-67.
Braden, R., "TCP Extensions for High Performance: An Update," Jun. 21, 1993.
Braden, R., and Postel, J., "RFC 1009—Requirements for Internet Gateways," Jun. 1987, pp. 1-55.
Braden, Robert, "Requirements for Internet Hosts—Communication Layers," Internet Engineering Task Force—RFC 1122, Oct. 1989, pp. 1-115.
Brakmo et al., "Performance Problems in BSD4.4 TCP", Dept. of Computer Science, University of Arizona, Tucson, AZ.
Brakmo et al., "TCP Vegas: End to End Congestion Avoidance on a Global Internet," Dept. of Computer Science, University of Arizona, Tucson, AZ.
Brakmo et al., "TCP Vegas: New Technologies for Congestion Detection and Avoidance," Dept. of Computer Science, University of Arizona, Tucson, AZ, 1996.
Braudes, R., and Zabele, S., "Requirements for Multicast Protocols," Network Working Group RFC 1458 Memo, May 1993, pp. 1-18.
Bulusu, Heidermann and Estrin, "GPS-less Low Cost Outdoor Localization for Very Small Devices," Univ. S. California, Apr. 2000.
Bunn, J.J., "Trip Report: DECworld," unpublished, May 18, 1992, pp. 1-11.
Caffery and Stuber, "Overview of Radiolocation in CDMA Cellular Systems," IEEE Communications Magazine, Apr. 1998, pp. 38-45.
Caffery and Stuber, "Subscriber Location in CDMA Cellular Networks," IEEE Trans Veh. Tech. vol. 47, May 1997.
Casner, Stephen, and Deering, Stephen, "First IETF Internet Audiocast," ACM SIGCOMM—Computer Communication Review, pp. 92-97.
Casner, Steve, "Frequently Asked Questions (FAQ) on the Multicast Backbone (MBONE)," Memo dated Dec. 22, 1994.
Catlin, Jeff, "VLAN," Email dated Nov. 22, 1995.
Challenges for Mesh Networks in UWB Applications, UWB Insider 2004 [retrieved Dec. 01, 2006] from the Internet: <URL: www.uwbinsider.com/technology/print/1_8_mesh_challenges.html>.
Chambers, Alan M. "IP multicast, Floyd Backes's Presentation, Denver," Email dated Nov. 1, 1995.
Chambers, Alan M. "Re: VLAN Ad Hoc Group," Email dated Jun. 14, 1995.
Chambers, Alan, "Mapping the Problem Space," Jul. 9, 1996.
Chan, Cheung-Win, and Yum, Tak-Shing, "An Algorithm for Detecting and Resolving Store-and-Forward Deadlocks in Packet-Switched Networks," IEEE Transactions on Communications, V.Com-35, No. 8, Aug. 1987, pp. 801-807.
Chen and Lin, "Route Optimization and Location Updates for Mobile Hosts," 16th IEEE Int. Conf. On Dist. Comp. Sys., May 1996.
Chen, Helen, et al., "Evaluation of DEC's Gigaswitch for Distributed Parallel Computing," Supersedes-SAND93-8013, Oct. 1993.

Chen, Xing, and Hayes, Jeremiah F., "Access Control in Multicast Packet Switching," IEEE/ACM Transactions on Networking, V.1, No. 6, Dec. 1993, pp. 638-649.

Cheriton, David R. "Virtual LAN Management Protocol (VLMP) Draft RFC," Stanford University and Granite Systems, Inc., Oct. 20, 1995.

Cheriton, David R., and Deering, Stephen E., "Host Groups: A Multicast Extension for Datagram Internetworks," Proceedings Ninth Data Computer Symposium, Sep. 10-13, 1985, pp. 172-179.

Cheriton, David R., and Williamson, Carey L., "VMTP as the Transport Layer for High-Performance Distributed Systems," IEEE Communications Magazine, Jun. 1989, pp. 37-44.

Cheriton, David R., and Zwaenepoel, Willy, "Distributed Process Groups in the V Kernel," ACM Transactions on Computer Systems, V.3, No. 2, May 1985, pp. 77-107.

Cheriton, David R., et al., "Ethernet Group Membership Protocol (EGMP) Draft RFC," Stanford Univeristy and Granite Systems, Oct. 12, 1995.

Cisco 7100 Series VPN Router, Cisco Systems, Inc.

Cisco VPN Routers, Cisco Systems, Inc. (1992-20001).

Cisco VPN Solutions, Cisco Systems, Inc. (2001).

Cohen, Jodi, "Critics Take Issue With Fuzzy VLAN Standards Work," Network World, Oct. 30, 1995, V.12, No. 44, pp. 1, 84.

Cohen, Jodi, "Opposing Virtual LAN Views," Network World, Oct. 28, 1996, V.13, No. 44, p. 75.

Cohen, Jodi, "The Truth About Virtual LANs," Network World, Oct. 28, 1996, V.13, No. 44, pp. 1,74.

Cohen, Jodi, "Too Small for VLANs," Network World, Nov. 4, 1996, V.13, No. 45, p. 31.

Conner, Krishnamurthy and Want, "Making Everyday Life Easier Using Dense Sensor Networks," Springer, 2001.

Connery, Glenn, "Re: VLAN Questions/Suggestions," Email dated May 6, 1996.

Corson and Macker, "Mobile As hoc Networking (MANET): Routing Protocal Performance Issues and Evaluation Considerations," Jan. 1999.

Crowcoft, John, "Talking of and to Gateways and Bridges," Email thread.

Cullerot, David, "Requirements for VLANs," 802.1 Interim Meeting, Oct. 1995, Cabletron Systems, Inc.

Cullerot, David, "Virtual LAN Topology," 802.1 Interim Meeting, Oct. 13, 1995, Cabletron Systems, Inc.

Cullerot, David, "VLAN Topology", 802.1 Interim Meeting, Oct. 13, 1995, Cabletron Systems, Inc.

DAVIEL, Internet Draft entitled, "Geographic Extensions for HTTP transactions," Apr. 2001.

Davis et al., "A Means for Expressing Location Information in the Domain Name System," Jan. 1996.

De Zhong, Wen, et al., "A Copy Network with Shared Buffers for Large-Scale Multicast ATM Switching," IEEE/ ACM Transactions on Networking, V.1, No. 2, Apr. 1993, pp. 157-165.

Deering, S., "RFC 1112—Host Extensions for IP Multicasting," Aug. 1989.

Deering, S., and Hinden, R., "RFC 2460—Internet Protocol, Version 6 (IPv6) Specification," RFC Archive, Dec. 1998 pp. 1-40.

Deering, S.E., "Host Extensions for IP Multicasting," Network Working Group—RFC 988 Memo, Jul. 1986, pp. 1-20.

Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.

Deering, Stephen E., and Cheriton, David R., "Multicast Routing in Datagram Internetworks and Extended LANs," ACM Transactions on Computer Systems, V.8, No. 2, May 1990, pp. 85-110.

Deering, Stephen Edward, "Multicast Routing in a Datagram Internetwork," UMI Dissertation Services, Dec. 1991, pp. 1-137.

Deering, Stephen, et al., "An Architecture for Wide-Area Multicast Routing," ACM, Apr. 1994, pp. 126-134.

Deering, Steve, et al., "Efficient Support for Sparse-Group Multicast Routing," Slides from Presentation by Deborah Estrin.

Denning et al. "Location-Based Authentication: Grounding Cyberspace for Better Security," 1996, Elsevier Science Ltd., pp. 1-6.

Derby, et al., "Scoping Multicasts in WAN Interconnected Local Networks," IBM Technical Disclosure Bulletin, Jan. 1992.

Drane, MacNaughton, and Scott, "Positioning GSM Telephones," IEEE Communications Magazine, Apr. 1998.

DUFFY, Jim, "Routers' Role Changes as Both Switches, VLANs Come Into Play," Network World, Jun. 3, 1996, V.13, No. 23, p. 22.

Eriksson, Hans, "MBONE: The Multicast Backbone," Communications of the ACM, V.37, No. 8, Aug. 1994, pp. 54-60.

Erramilli, A., and Singh, R.P., "A Reliable and Efficient Multicast Protocol for Broadband Broadcast Networks," ACM, 1988, pp. 343-353.

Estrin, Deborah, and Wei, Liming, "Multicast Routing in Dense and Sparse Modes: Simulation Study of Tradeoffs and Dynamics," IEEE, Jul. 1995, pp. 150-157.

Fall et al., "Comparison of Tahoe, Reno, and Sack TCP," Lawrence Berkeley National Laboratory, Berkeley, CA, Dec. 2, 1995.

Feldmann, et al., "NetScope: Traffic Engineering for IP Networks," IEEE Network Mag. 2000.

Feltman, Charles, "A Reality Check on Virtual LANs," Business Communications Review, V.26, No. 7, Jul. 1996, p. 27.

Finn, Norman W., "External and Internal Addresses in Explicit Tags," Email dated Jan. 25, 1996.

Finn, Norman W., "Implicit vs. Explicit VLAN Frame Tagging," Email dated Jan. 25, 1996.

Finn, Norman, W., "Re: 802.1 Interim Meeting—VLANs—Objectives, Contributions, Agenda," Email dated May 17, 1996.

Finn, Norman W., "Re: VLAN Questions/Suggestions," Email dated May 8, 1996.

Finn, Norman W., "Re: VLANs and IP Multicast," Email dated May 9, 1996.

Finn, Norman W., "Slides for External and Internal Addresses in Explicit Tags," Email dated Jan. 25, 1996.

Finn, Norman W., "Slides for Implicit vs. Explicit VLAN Frame Tagging," Email dated Jan. 25, 1996.

Finn, Norman W., "Two Models for VLAN Tagging," Email dated Mar. 8, 1996.

Finn, Norman, "Multiple Spanning Trees in 802.1Q," IEEE 802.1 Presentation, Sep. 26, 1996, pp. 1-11.

Floyd et al., "Increasing TCP's Initial Window," Jul. 1997.

Floyd, S., "Issues of TCP with SACK," Mar. 9, 1996.

Floyd, S., "TCP and Successive Fast Retransmits," Lawrence Berkeley Laboratory, Berkeley, CA May 1995.

Frantz, Paul, "Re: Re: Revision to SDE," Email dated Nov. 24, 1995.

Frantz, Paul, et al., "Proposed VLAN Service Definition," IEEE 802.1 Presentation, Denver, Oct. 13, 1995.

Gabber and Wool, "On Location-Restricted Services," IEEE Network, Nov./Dec. 1999.

Garcia-Molina, Hector, and Spauster, Annemarie, "Ordered and Reliable Multicast Communication," ACM Transactions on Computer Systems, V.9, No. 3, Aug. 1991, pp. 242-271.

Gessler and Jesse, "Advanced Location Modeling to Enable Sophisticated LBS Provisioning in 3G Networks," retrieved from www.teco.edu/locationws/9.pdf, Jul. 2002.

Gong, Li, and Shacham, Nachum, "Elements of Trusted Multicasting," IEEE, Apr. 1994, pp. 23-30.

Gopal, Inder, and Rom, Raphi, "Multicasting to Multiple Groups over Broadcast Channels," IEEE, 1988, pp. 79-81.

Greenfield, David, "A Realistic Approach to Virtual LANs," Data Communications, Feb. 1996, V.25, No. 2, pp. 50, 52.

Hain, T., Internet Drafts entitled "An IPv6 Provider-Independent Global Unicast Address Format," and "Application and Use of the IPv6 Provider Independent Global Unicast Format," Oct. 2001.

Hanks, S., "Generic Routing Encapsulation (GRE)," Oct. 1994.

Harris & Jeffries, Inc., "A Proposal for Software Development—for an IP-Router Facility," Proposal # 910214.01, Feb. 19, 1991.

Harris, B., "Amulet: Approximate Mobile User Location Tracking System," Retrieved from www.winlab.rutgers.edu/ ~sachin/papers/papers.html, Jul. 2002.

Hart, John and Backes, Floyd, "IEEE 802 Virtual LANs (VLANs), Proposed Definition and Requirements," dated Jul. 10, 1995.

Hart, John, "Re: Re: Revision to SDE," Email dated Nov. 25, 1995.

Hausman, Richard and Ruby, Doug, "Application Requirements for Support of Duplicate Addresses in VLANs," Contribution to IEEE 802.1Q, Vancouver Plenary, Nov. 11, 1996.
Hausman, Richard, "Re: 802.1Q VLAN PAR Backwards Interoperability," Email dated Jun. 24, 1996.
Hawe, Bill, et al., "Transparent Interconnection of Local Area Networks with Bridges," Journal of Telecommunication Networks, V.3, No. 2, pp. 139-152.
Heidemann, J., "Using Geospatial Information in Sensor Networks," USC/Information Sciences Institute, Sept. 17, 2001.
Heywood, Drew, et al., "Enterprise Series Connectivity: Local Area Networks," 1992, pp. 327-353.
Hightower and Borriello, "A Survey and Taxonomy of Location Systems for Ubiquitous Computing," University of Washington Technical Report, UW-CSE 01-08-03, Aug. 24, 2001.
Hightower, Borriello, and Want, "SpotON: An indoor 3D Location Sensing Technology Based on RF Signal Strength,"University of Wisconsin CSE Technical Report #2000-02-02, Feb. 18, 2000.
Horowitz, Steve, "Priority Bits & First on the Wire Question," Email dated Jun. 25, 1996.
Horowitz, Steve, "Priority Bits Discussion," Email dated Jun. 7, 1996.
Horowitz, Steve, "VLAN Issues List," Email dated Jun. 7, 1996.
Housley, Russ, "Use of SDE to within VLAN Standard," Email dated Jan. 23, 1996.
Huat, Ong Sion, and Hiong, Goh Seow, "A Generic Multicast-Key Determination Protocol," Defence Science Organization, Singapore. Ideal Congestion Control, Sep. 1997.
Imielinski and Navas, "GPS-Based Addressing and Routing," Nov. 1996.
Interior Gateway Routing Protocol, Cisco Systems, Inc. (1999).
International Search Report and Written Opinion from PCT/U505/06503.
IP Sec, Cisco Systems, Inc. (1998).
Jacobson, V., "Design Changes to the Kernel Network Architecture for 4.4BSD," Lawrence Berkeley Laboratory, Berkeley, CA May 1992.
Jacobson, V., "Dynamic Congestion Avoidance/Control," email message, Feb. 1988.
Jacobson, V., "End2End," email message, Mar. 1994.
Jacobson, V., "Modified TCP Congestion Avoidance Algorith," email message, Apr. 1990.
Jacobson, V., "Re: Interpacket arrival variance and mean," email message, Jun. 15, 1987.
Jacobson, V., "Re: your congestion scheme," email message, Nov. 1987.
Jacobson, V., "Some Design Issues for High-Speed Networks," Lawrence Berkeley Laboratory, Berkeley, CA Nov. 1993.
Jacobson, V., "TCP Extensions for High Performance," email message, Feb. 1997.
Jacobson, V., "TCP Extensions for Long-Delay Paths," Oct. 1988.
Jeffree, Tony, "Brief Minutes of 802.1—Maui, Jul. 1995," IEEE 802.1 Maui, Jul. 1995.
Jeffree, Tony, "Input paper for July Meeting—Proposed changes to 802.1D Section 3," Email dated Jun. 22, 1995.
Jeffree, Tony, "Proposed Use of GARP for Distribution of VLAN Membership Information," Oct. 28, 1996.
Jeffree, Tony, "Re: Re: Revision to SDE," Email dated Nov. 24, 1995.
Jeffree, Tony, "Re: VLAN Questions/Suggestions," Email dated May 7, 1996.
Jia, Xiaohua, and So, Shirley Y., "A Multicast Mechanism with Ordering on Overlapping Groups," IEEE, 1993, pp. 242-249.
Jing, Hsu Wen, "Multicasting on Certain Self-Similar Networks," Division of Computer Technology—School of Applied Science—Nanyang Technological University, Singapore.
Joe Francica, "Location-based Services: Where Wireless Meets GIS," retrieved from www.geoplace.com, Jul. 2002.
Karagiannis and Heijeck, "Mobile IP: A State of the Art Report," Ericsson Open Report, Jul. 13, 1999.
Keen, Hal, "Comment on P802.1p/D0," Email dated Oct. 30, 1995.
Kindberg and Barton, "The Cooltown User Experience," Hewlett Packard Laboratories, HPL-2001-22, Feb. 2, 2001.
King, Steven S., "It's an Adventure," Network World, Apr. 10, 1995, pp. 49, 54-55.
King, Steven S., "Switched Virtual Networks—Internetworking Moves Beyond Bridges and Routers," Data Communications, Sep. 1994, pp. 66-80.
King, Steven S., "VLANS Raise Delicate Design Issues," Network World, Apr. 17, 1995, V.12, No. 16, pp. 42-43.
King, Steven, "The Many Faces of Virtual LANs," Network World, Mar. 27, 1995, V.12, No. 13, pp. 59-65.
Klamm, Keith, "Dancing Bears in Readable Text Format," Email dated Mar. 8, 1996.
Knight, Fred S., "Broadband Future Faces Snarls Snarls and Gnarls," Business Communications Review, V. 23, No. 12, Dec. 1993, p. 6.
Kompella, Vachaspathi, et al., "Multicast Routing for Multimedia Communication," IEEE/ACM Transactions on Networking, V.1, No. 3, Jun. 1993, pp. 286-292.
Kompella, Vachaspathi, et al., "Multicasting for Multimedia Applications," Department of Computer Science and Engineering—University of CA, San Diego.
Korkea-Aho and Tang, Internet Drraft (May 2001) entitled "Spactial Location Payload," May 2001.
Langille, Paul, "Partitioning of VLAN Tasks," Email dated Nov. 16, 1995.
Langille, Paul, "Re: Revision to SDE," Email dated Nov. 22, 1995.
Langille, Paul, "Re: . . . Re: Revision to SDE," Email dated Nov. 29, 1995.
Lawson, Stephen, "3Com Unveils a Single Solution for Virtual LANs," InfoWorld, May 13, 1996, V.18, No. 20, p. 59.
Lawson, Stephen, "Cabletron Buys Netlink to Fill Out Frame Relay," InfoWorld, Oct. 7, 1996, V.18, No. 41, p. 51.
Lewis, Bob, "Do VLANs Solve Any Real Problems? Lots of People Seem to Think So," InfoWorld, Jun. 17, 1996, V.18, No. 25, p. 91.
Li et al, "A Scalable Location Service for Geographic Ad Hoc Routing," Proceedings of the ACM MOBICOM 2000 Conference.
Liao, Tseng, and Sheu, "GRID: A Fully Location-Aware Routing Protocol for Mobile As Hoc Networks," Telecommunications Systesm, 2001.
Lidinske, Bill, "802.1 Minutes and Document Plan," Mar. 8, 1995.
Lidinsky, Bill "Re: VLAN Ad Hoc Group," Email dated Jun. 12, 1995.
Lidinsky, Bill, "802.1Q Draft PAR," Email dated Dec. 19, 1995.
Lidinsky, Bill, "8021. Interim Mtg VLAN Agenda," Email dated Oct. 1995.
Lidinsky, Bill "IEEE 802 Overall Agenda—Jul. 1996," Email dated Jun. 23, 1996.
Lidinsky, Bill, "Re: 802.?q," Email dated Jun. 21, 1996.
Lidinsky, Bill, "RE: VLAN use of SDE," Email dated Oct. 2, 1995.
Lidinsky, Bill "VLAN use of SDE," Email dated Oct. 1, 1995.
Lindmeyr, Johann, "VLAN Tagging and Classification," Email dated Nov. 30, 1995.
Lippis, Nick, "Virtual LANs: Real Drawbacks," Data Communications, Dec. 1994, pp. 23-24.
MacLeod, Brian, "1Gbps Ethernet" Email dated Oct. 9, 1995.
Marasli et al., "Partially Reliable Transport Service," Proceedings 2nd IEEE Symp. On Comp. and Comm. (Cat. No. 97TB100137), Proceedings Second IEEE Symposium on Computer and Commmunications, Alexandria, Egypt, Jul. 1-3, 1997, pp. 648-656, XP002131820.
Marasli et al., "Retransmission-Based Partially Reliable Transport Service: An Analytic Model," Proceedings of INFOCOM, US, Los Alamitos, IEEE Comp. Soc. Press, Vol. Conf. 15, 1996, pp. 621-629, XP000621327 (ISBN: 0-8186-7293-5).
Markowsky, George, and Moss, Franklin H., "An Evaluation of Local Path ID Swapping in Computer Networks," IEEE Transactions on Communications, V.Com-29, No. 3, Mar. 1981, pp. 329-336.
Martillo, Joachim, "Re: InterOp Debate," Email thread dated Nov. 6, 1991.
Martillo, Joachim, "Using Wide-Area Point-to-Point Links for Computer Networking," Email thread dated Sep. 1, 1991.
Martillo, Yakim, "Re: Ethernet Multicast," Archived Emails.
Mathis et al., "Forward Acknowledgement: Refining TCP Congestion Control," Pittsburgh Supercomputing Center.

Mathis et al., "TCP Rate-Halving with Bounding Parameters," Pittsburgh Supercomputing Center, Oct. 1996.
Mathis et al., "TCP Selective Acknowledgement options," email message, Oct. 1996.
Mauve and Widmer, "A survey on Position-Based Routing in Mobile Ad Hoc Networks," IEEE Network, Nov./Dec. 2001.
Mayer, Erwin, "An Evaluation Framework for Multicast Ordering Protocols," ACM, 1992, pp. 177-187.
McCarthy, Vance, "Fast Ethernet and VLANs," Datamation, Apr. 1, 1996, V.42, No. 7, p. 13.
McConnell, John, "VLANs Are Here to Stay," Network World, Jul. 1, 1996, p. 37.
McGeough, J., "Location-Based Services and Topology," Jul. 26, 2001.
McGeough, J., "Wireless Location Positioning From Existing Signal Level Data," Dec. 12, 2001.
McGibbon, Alex, "Virtual LANs Come of Age," Telecommunications, Jun. 1996, pp. 48-52.
McKeown, Nick, et al., "The Bay Bridge: A High Speed Bridge/Router," Protocols for High-Speed Networks, III (C-9), 1992, pp. 203-218.
McKinley, Philip, and Liu, Jane W.S., "Multicast Routing in Bus-Based Computer Networks," IEEE, 1988, pp. 277-287.
McNealis, Martin, "Re: Revision to SDE," Email dated Nov. 17, 1995.
McNealis, Martin, "Virtual LAN Requirements," Cisco Systems, IEEE 802.1 Interim, Oct. 12, 1995.
Merhar, Milan, "Priority Bits Discussion," Email dated Jun. 7, 1996.
Merhar, Milan, "VLAN Questions/Suggestions," Email dated May 7, 1996.
Merhar, Milan, "VLANs and IP Multicast," Email dated May 9, 1996.
Messier, Fattouche and Peterson, "Locating an IS-95 Mobile Using its Signal," Conf. Rec. The Tenth International Conference on Wireless Communications (Wireless 98). vol1l, (Calgary, AB, Canada), pp. 562-574.
Meyer, G., "The PPP Encryption Control Protocol (ECP)," Spider Systems, email message, Jun. 1996.
Miller, Ken, "Broadcast News: Multicasting the WAN," Data Communications, V.24, No. 3, Mar. 1995, pp. 25-26.
MMCNEALIS@CISCO.COM, "1995-The year of the Virtual LAN," IEEE Conference Presentation, Maui, Jul. 1995.
Momirov, Milan, "VLANs and IP Multicast," Email dated May 9, 1996.
Moore, Periakaruppan, and Donohoe, "Where in the World is netgeo.caida.org?" Proc. Internet Soc. Con. (INET), 2000.
Moore, Steve, "Virtual LAN Explainer," Computerworld, Jun. 13, 1994, V.28, No. 24, p. 85.
Morency, John and Winkler, Kathrin, "VLANs: Can Layer 3 Save the Day?," Business Communications Review, pp. 47-50.
Moy, John, "MOSPF: Bringing Multicast to Commercial TCP/IP Nets," Network World, V.11, No. 25, Jun. 20, 1994, pp. 11,20.
Moy, John, "Multicast Routing Extensions for OSPF," Communications of the ACM, V.37, No. 8, Aug. 1994, pp. 61-66.
Network Working Group Request for Comments: 1072, "TCP Extensions for long-Delay Paths," Sept. 1997.
Ngoh, L.H., "Multicast Support for Group Communications," Computer Networks and ISDN Systems, 1991, pp. 165-178.
Ngoh, L.H., and Hopkins, T.P., "Transport Protocol Requirements for Distributed Multimedia Information Systems," The Computer Journal, V.32, No. 3, 1989, pp. 252-261.
Niculescu and Nath, "Adhoc Positioning System (APS)," in IEEE GlobeCom, Nov. 2001.
Ofek, Yoram, "Multicast and Semi-FIFO Protocols over Virtual Rings in the MetaNet," IBM T.J. Watson Research Center, Yorktown Heights, NY.
Olsen, Bob, "Up Close: Populating a Virtual LAN," Network World, Oct. 30, 1995, V.12, No. 44, p. 49.
Open Shortest Path First, Inernetworking Technology Overview (1999).
Padmanabhan and Subramanian, "An Investigation of Geographic Mapping Techniques for Internet Hosts," SIGCOMM '01, Aug. 27-31, 2001, San Diego, CA.

Padmanabhan and Subramanian, "Determining the Geographic Locations of Internet Hosts," In Proc. ACM SIGCOMM, Aug. 2001.
Pahlavan and Li, "Indoor Geolocation Science and Technology," IEEE Comminications Magazine, Feb. 2002.
Partridge et al., "A Faster UDP," IEEE/ACM Trans. On Networking, Aug. 1993.
Pasquale, Joseph C., et al., "The Multimedia Multicast Channel," Department of Computer Science and Engineering, University of CA, San Diego.
Passmore, David and Freeman, John, "The Virtual LAN Technology Report", Decisys, Inc., May 1996.
Pattavina, Achille, "Design and Performance Evaluation of a Packet Switch for Broadband Central Offices," INFOCOM Dept., University "La Sapienza", Rome, Italy, 1990, pp. 1252-1259.
Paul, Sanjoy, et al., "Multicast Transport Protocols for High Speed Networks," IEEE Apr. 1994, pp. 4-14.
Perlman, Radia, "An Algorithm for Distributed Computation of a Spanning Tree in an Extended LAN," Proceedings—Ninth Data Communications Symposium, Whistler Mountain, British Columbia, Sep. 10-13, 1985.
Perry, Yonadev, "Re: Re: Re: Revision to SDE," Email dated Nov. 27, 1995.
Perry, Yonadev, "Re: Revision to SDE," Email dated Nov. 26, 1995.
Petrosky, Mary, "HUB Shopping Spree," Network World, May 29, 1995.
Polk and Tang, "Spactial Location Server Authentication," Internet Draft (Mar. 2000).
Postel, J. and Reynolds, J., "A Standard for the Transmission of IP Datagrams Over IEEE 802 Networks," Network Working Group—RFC 1042 Memo, Feb. 1988, pp. 1-15.
Priyantha, N., "Providing Precise Indoor Location Information to Mobile Devices," Master's thesis, Massachusetts Institute of Technology, Jan. 2001.
Rajagopalan, Bala, "Reliability and Scaling Issues in Multicast Communication," Computer Communication Review, SIGCOMM 1992 Conference Proceedings, Baltimore, MD, Aug. 17-20, pp. 188-198.
Rand, D., "The PPP Compression Control Protocol (CCP)," Novell, email message, Jun. 1996.
Rijsinghani, Anil, "minutes from day 3 of Interim 802.1 meeting," Email dated Oct. 19, 1995.
Rijsinghani, Anil, "Re: 802.1Q VLAN PAR Backwards Interoperability (802.5/FDDI Coding Issue)," Email dated Jun. 13, 1996.
Rijsinghani, Anil, "Re: VLAN Progress, Tagging, SDE etc.—Just Hold It Please," Email dated Nov. 24, 1995.
Rios, S., "Location Based Services: Interfacing to a Mobile Positioning Center," retrieved from www.wirelessdevnet.com/channels/lbs/features/lbsinterfacing.html, Jun. 2002.
Rivers, Jr., "Re: VLAN Questions/Suggestions," Email dated May 6, 1996.
Rizzo, L., "Issues in the implementation of selective acknoledgements for TCP," email message, Jan. 1996.
Rooney, Sean, et al., "Automatic VLAN Creation Based on On-line Measurement," Computer Communication Review, pp. 50-57.
Salwen, Howard et al., "Examination of the Applicability of Router and Bridging Techniques," IEEE Network, V.2, No. 1, Jan. 1988, pp. 77-80.
Saunders, Stephen, "Building Virtual LANs on a Real-World Budget," Data Communications, Sep. 21, 1995, pp. 39-40.
Saunders, Stephen, "Making Virtual LANs a Virtual Snap," Data Communications, Jan. 1995, pp. 72-74.
Saunders, Stephen, "Matrix-Based Switching Revs Up the LAN," Data Communications, Mar. 21, 1994, pp. 35-36.
Saunders, Stephen, "Switch Puts Virtual LANs on Automatic Pilot," Data Communications, Sep. 1994, pp. 45-46.
Sayed, Ayman, "Re: Revision to SDE," Email dated Nov. 22, 1995.
Seaman, Mark, "For 802.0—Proposed 802.1 PAR," Email dated May 26, 1995.
Seaman, Mark, "Re: IEEE Plenary—VLANs—802.1 Meeting" Email dated Jul. 4, 1995.
Seaman, Mick, "[Mark Sankey/US/3Com: Gigabit Enet and VLAN]," Email dated Apr. 13, 1996.
Seaman, Mick, "802.1 Interim Meeting—VLANs—Objectives, Contributions, Agenda," Email dated May 3, 1996.

Seaman, Mick, "802.1 Interim on VLANs: Discussion of Requirements," Email dated Oct. 25, 1995.
Seaman, Mick, "802.1 VLAN Interim Meeting—Reminder and Initial Agenda," Email dated Jan. 22, 1996.
Seaman, Mick, "VLAN Progress, Tagging, SDE etc.—Just Hold It Please," Email dated Nov. 22, 1995.
Seamen, Mick, "Foil for Discussion, IEEE 802.1 Closing Plenary," IEEE 802.1 Meeting, Jul. 11, 1996.
Seamn, Mick, "802.1 Agenda, Denver Interim Meeting (VLANs, etc.)," Email dated Jul. 28, 1995.
Seifert, Rich, "Re: Type Field Values," Email dated May 29, 1996.
Seifert, William M., "Bridges and Routers," IEEE Network, V. 2, No. 1, Jan. 1988, pp. 57-64.
Seifert, William M., "Bridges and Routers," IEEE Network, V.2, No. 1, Jan. 1988, pp. 57-64.
Sellers, Philip, "Cabletron Gambling on Virtual LANS," Computing Canada, Apr. 25, 1996, V.22, No. 9, p. 27.
Shah, Himanshu, "Re: 802.1Q VLAN PAR Backwards Interoperability (802.5/FDDI Coding Issue)," Email dated Jun. 14, 1996.
Shah, Himanshu, "Re: Re: Revision to SDE," Email.
Sharma et al., "Scalable Timers for Soft State Protocols," Information Sciences Institute, University of Southern California.
Shimada, K. Karl, "VLAN Classes," IEEE 802.1 Interim Meeting Presentation, Denver CO, Oct. 11-13, 1995, Rising Star Research.
Shimada, K. Karl, "VLAN Definition," IEEE 802.1 Interim Meeting Presentation, Denver CO, Oct. 11-13, 1995, Rising Star Research.
Shimada, K. Karl "VLAN Requirements," IEEE 802.1 Interim Meeting Presentation, Denver CO, Oct. 11-13, 1995, Rising Star Research.
Shimada, Karl K. "802.1 Interim meeting," Email dated Aug. 22, 1995.
Simpson, W., "The Point-to-Point Protocol (PPP)," Daydreamer, Jul. 1994.
Sincoskie, David W., and Cotton, Charles J., "Extended Bridge Algorithms for Large Networks," IEEE Network, V.2, No. 1, Jan. 1988, pp. 16-24.
Slager, "IEEE 802.1 Opening Plenary Minutes," IEEE 802.1 Meeting, University of Twente, Enschede, Netherlands, Jul. 8, 1996.
Slager, R.V., "Email Voting Ballot: P802.1j/D5: Managed Objects for MAC Bridges—Supplement to IEEE Std. 802.1d", IEEE, Aug. 02, 1995.
Slager, Rosemary V., "IEEE 802.1 (unofficial) VLAN Meeting Minutes," IEEE 802.1 Milpitas, CA, Jan. 24, 25, 1996.
Slager Rosemary, "802.1 Interim Meeting Minutes," 802.1 Interim Meeting, Wakefield, MA, Jun. 1996.
Slager, Rosemary, "IEEE 802.1 Interim Meeting Minutes," IEEE 802.1 Meeting, Ottawa, Canada, Oct. 2, 1996 through Oct. 4, 1996.
Slager, Rosemary, "June96 Resolutions," Email dated Jun. 7, 1996.
Slager, Rosemary, "Proposed Minutes," Email dated Jun. 19, 1996.
Slofstra, Martin, "Cisco Unveils Multimedia 'Blueprint'," Computing Canada, V.21, No. 7, Mar. 29, 1995, p. 21.
Small, Smailagic and Siewiorek, "Determining User Location for Contect Aware Computing Through the Use of a Wireless LAN Infrastructure," retrieved from http://www.cs.cmu.edu/laura/docdir/small00.pdf, 2003.
Stallings, William, "2.2 Communication Switching," Local Networks, 2nd Ed., 1987, pp. 32-33, 410-416, Macmillan Publishing Company, New York, NY.
Sterkel, Terrance E, "Re: VLAN Progress, Tagging, SDE etc.—Just Hold It Please," Email dated Nov. 23, 1995.
Stern, T.E., and Jiang, Song, "Multicast—Multihop Networks: Connectivity and Performance," Summary, Department of Electrical Engineering and CTR, Columbia University, pp. 1-8.
Steve <WITZ@CHIPCOM.COM>, "RE: IP Multicast, Floyd Backes's Presentation, Denver," Email dated Nov. 1, 1995.
Steve <WITZ1961@AOL.COM>, "Default VLAN," Email dated May 7, 1996.
Steve <WITZ1961@AOL.COM>, "Loop Issues," Email dated May 9, 1996.
Steve <WITZ1961@AOL.COM>, "VLAN Questions/Suggestions," Email dated May 6, 1996.
Stevens, W., "TCP Slow Start, Congestion Avoidance, Fast Retransmit, and Fast Recovery Algorithms," NOAO, Jan. 1997.

Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.
Tang and Polk, "Spatial location BOF (spatial) of IETF," retrieved from www.nrc.nokia.com/ietf-spatial/.
Tang, Polk, Korkea-Aho and Takahashi, Internet Draft (Nov. 2000) entitled "Spatial Location Payload Requirements with Protocol Recommendations".
Tang, Ruuru, and Loughney, Internet Draft (Feb 14, 2000) entitled "Problems and Requirements of Some IP Applications Based on Spatial Location Information,".
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
TCP Selevtive Acknoledgement option (and related changes) for FreeBSD, Sept. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPAA & TRUESCCESS," 2001, p. 1.
US Patent Application File Wrapper 07/773,161.
Vielmetti, Edward et al., "Messages for Dec 1992," Google Groups: comp.dcom.isdn, Message board thread, Dec. 1992.
Virtual Router Redundancy Protocol, Network Working Group Request for Comments: 2338.
Waitzman, D., et al., "Distance Vector Multicast Routing Protocol," Network Working Group—RFC 1075, Nov. 1988, pp. 1-24.
Wakerly, John, "An Efficient Frame-Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.
Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan 1992.
Ward, Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sept. 1998.
Williamson R., "Introduction to Location based Services for Mobile Wireless Users," Approach to Training Situation Awareness, retrieved from www.ecdesignnet.com/papers/location%20Based/%20Services%202002.htm, Jul. 2002.

Wright, Michele, "Re: VLAN Questions/Suggestions," Email dated May 6, 1996.

Wright, Michele, "Re[2]: VLAN Questions/Suggestions," Email dated May 7, 1996.

Written Opinion and Search Report from PCT US99/22919, Jan. 30, 2001 (10 pages).

Written Opinion from PCT/US03/06169, Aug. 13, 2005 (5 pages).

Yang, Henry and Rijsinghani, Anil, "Some VLAN Requirements & Considerations," IEEE 802.1 Maui, Jul. 11, 1995.

Zagami and Parl, "Providing a Universal Location Services Using a Wireless E911 Location Network," IEEE Communications Magazine, Apr. 1998.

ZIPF, A., "User-Adaptive Maps for Location-Based Services (LBS) for Tourism," Proc. Of Enter Comm. Tech in Tourism, Innsbruck Austria, Springer Computer Science, 2002.

Zwicker, H.R., "Netzwerke—Die Informationstransporter der Moderne," Elektrotechnik, Jun. 1993.

* cited by examiner

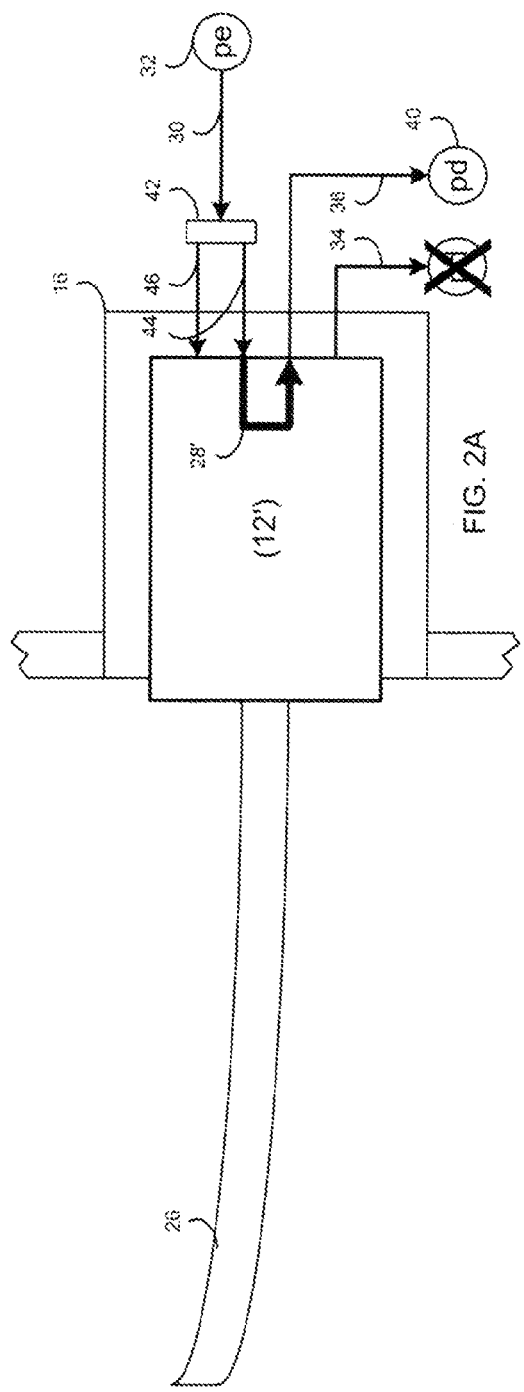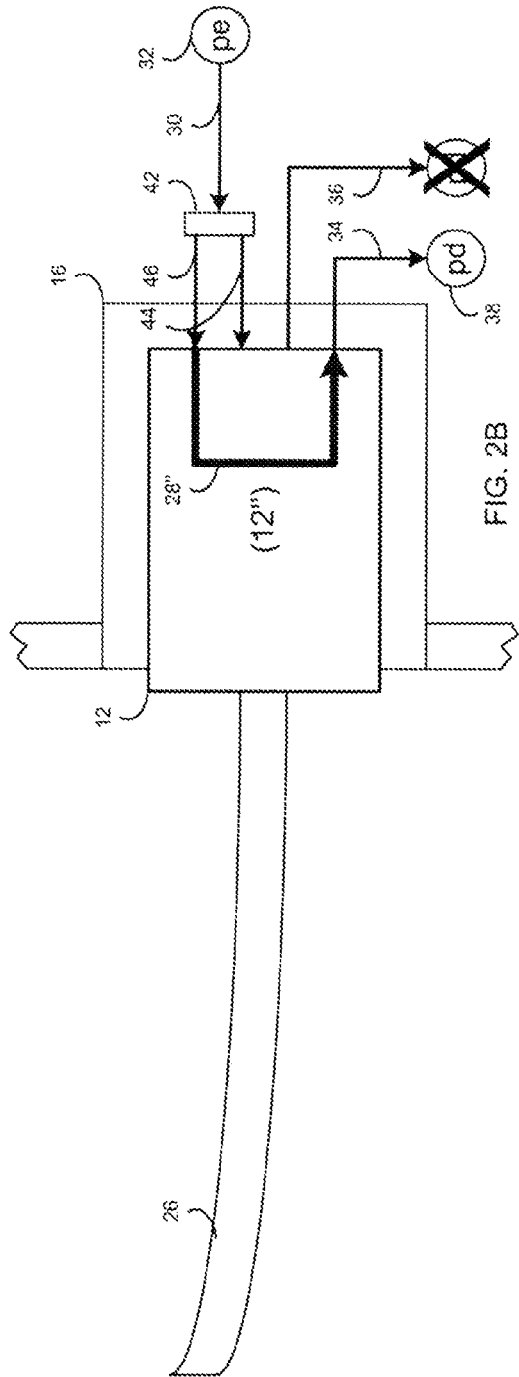

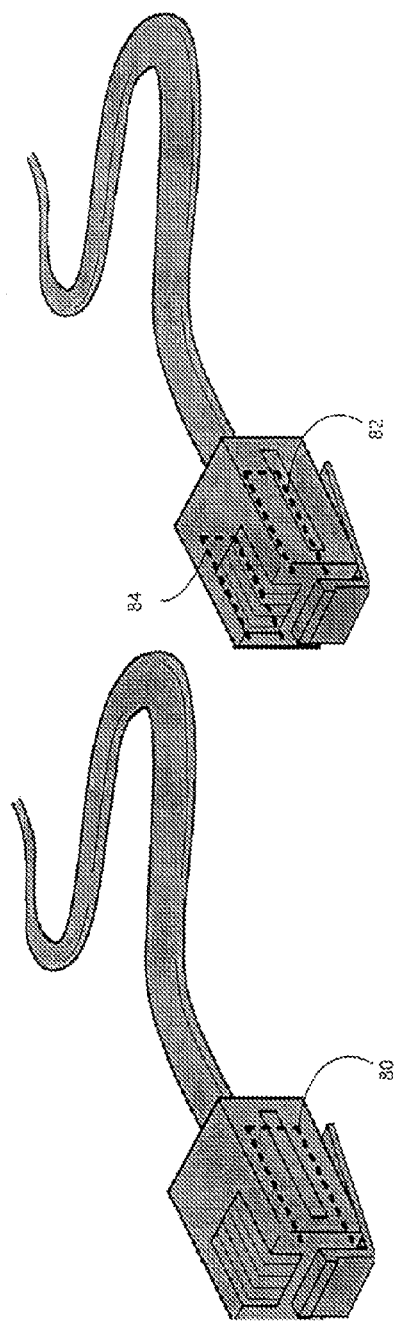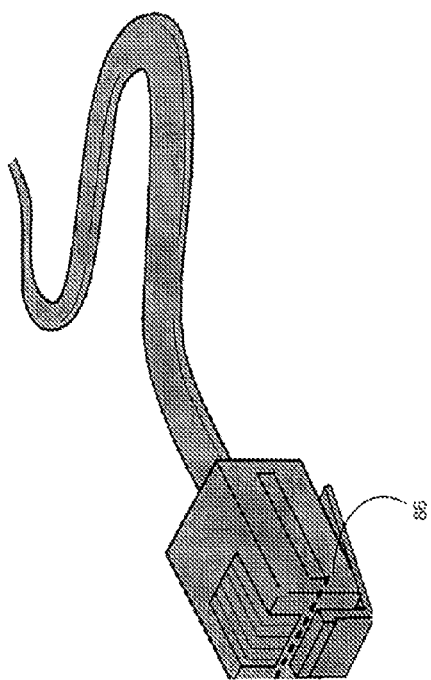
FIG. 3A
FIG. 3B
FIG. 3C

OPTICAL INTERFACE IDENTIFICATION SYSTEM

RELATED APPLICATIONS

This application claims the priority of the following application, which is herein incorporated by reference: U.S. Provisional Application Ser. No.: 60/626,002 entitled, "Optical Detection of Plug Type and Insertion Status", filed 8 Nov. 2004.

This application herein incorporates by reference the following applications: U.S. patent application Ser. No. 10/737,652, entitled "Modular Receptacle and Interface with Integral Optical Indication", filed 17 Dec. 2003; and U.S. patent application Ser. No. 10/858,416, entitled "Visual Optical Indicators for Plug Assemblies, Connectors and Cables", filed 1 Jun. 2004. Both applications are assigned to common assignee Enterasys Networks, Inc.

FIELD OF THE DISCLOSURE

This disclosure relates to cabling systems and, more particularly, to smart cabling systems that identify various cable connections and interface types.

BACKGROUND

Socket assemblies have routinely been provided with optical indicators for status indication. The indicators have typically consisted of LEDs (Light Emitting Diodes) or light pipe viewing surfaces located on the assembly face plane adjacent the individual socket assemblies. These indicators are then selectively illuminated to provide visual information relating to the particular socket assembly.

One approach to provide a visual display of information integrated into the connector itself is disclosed in the above referenced and commonly assigned U.S. patent application Ser. No. 10/737,652. This approach utilizes light pipes to selectively illuminate the interior of a socket assembly, which in turn, illuminates a conventional transparent plug assembly inserted therein.

In addition, U.S. patent application Ser. No. 10/858,416, details approaches and methods to aid in the display of information on the inserted plug interfaces, both on the local and remote end of the cabling assemblies.

However, as is understood in interconnect systems, there may be many uses defined for a given connector system. Plugs are often standardized for a given use, but may migrate over time to support multiple revisions of a particular interface or other uses. The IEEE 802.3 has several popular connector types such as the 8 pin Modular Jack (MJ-8) that is used for Ethernet. This connector has a long history and has been used at speeds of 1, 10, 100, 1000, 10,000 Megabits per second. At some speeds all eight pins are used, at other speeds only half the pins are used. In a new standard IEEE 802.3af, a small amount of power may optionally be added to a specific pair set or as an alternate option it may be sent down the other pair set. In addition, the IEEE standards define several cabling types such as "straight through" connections or alternately "crossover" connections of the cable for connecting various devices with MJ-8 Ethernet receptacles together. Making matters worse, the standard interface for many telecoms (phone systems) for businesses also uses the exact same eight pin connector plug and socket assembly.

As connectors increase in popularity they decease in cost and that low cost invites other different and often disparate uses. In some cases, the uses may be not only incompatible, but incorrect connections may harm the electrical interfaces and attached devices.

SUMMARY OF THE DISCLOSURE

According to an aspect of this disclosure, a connector assembly, configured to releasably couple a socket assembly, includes zero or more data conductors. An optical pathway is configured to: receive an optical signal from an optical light source positioned within the socket assembly; and provide at least a portion of the optical signal to an optical light target positioned within the socket assembly.

One or more of the following features may also be included. The optical light source may be a photo emitter. The optical light target may be a photo detector. The optical light target may be an optical conductor that is optically-coupled to a photo detector. At least one of the zero or more data conductors may be an electrical data conductor. At least one of the zero or more data conductors may be an optical data conductor.

The optical signal may include optical energy within a defined optical spectrum. The optical pathway may include an optical filter for filtering a portion of the defined optical spectrum.

The connector assembly may include one or more additional optical pathways. Each additional optical pathway may be configured to: receive the optical signal from the optical light source positioned within the socket assembly; and provide at least a portion of the optical signal to a unique optical light target positioned within the socket assembly. The optical pathway may include at least one fiber-optic conductor. The optical pathway may include at least one optical reflector.

The connector assembly may include an optical indicator assembly. The optical pathway may be further configured to provide at least a portion of the optical signal to the optical indicator assembly. The optical indicator assembly may be configured to provide a visual indicator concerning a characteristic of the coupling of the socket assembly and the connector assembly in response to receiving the at least a portion of the optical signal.

According to another aspect of this disclosure, a cable assembly includes a conductor assembly including zero or more data conductors. A first connector assembly is affixed to a first distal end of the conductor assembly and is configured to releasably couple a first socket assembly. A second connector assembly is affixed to a second distal end of the conductor assembly and is configured to releasably couple a second socket assembly. A first optical pathway is configured to: receive a first optical signal from a first optical light source positioned within the first socket assembly; and provide at least a portion of the first optical signal to a first optical light target positioned within the first socket assembly.

One or more of the following features may also be included. The first optical pathway may include a first optical conductor positioned within the conductor assembly and configured to provide at least a portion of the first optical signal from the first connector assembly to the second connector assembly. The first optical pathway may include a second optical conductor positioned within the conductor assembly and configured to provide at least a portion of the first optical signal, provided by the first optical conductor to the second connector assembly, from the second connector assembly to the first connector assembly.

The cable assembly may include a second optical pathway configured to: receive a second optical signal from a second optical light source positioned within the second socket assembly; and provide at least a portion of the second optical signal to a second optical light target positioned within the second socket assembly. The first optical light source may be a photo emitter. The first optical light target may be a photo detector. The first optical light target may be an optical conductor, which is optically-coupled to a photo detector.

The first optical signal may include optical energy within a defined optical spectrum. The first optical pathway may include an optical filter for filtering a portion of the defined optical spectrum. The first optical pathway may include at least one fiber-optic conductor. The first optical pathway may include at least one optical reflector.

The cable assembly may include an optical indicator assembly. The first optical pathway may be further configured to provide at least a portion of the first optical signal to the optical indicator assembly. The optical indicator assembly may be incorporated into the first connector assembly and may be configured to provide a visual indicator concerning a characteristic of the coupling of the first socket assembly and the first connector assembly in response to receiving the at least a portion of the first optical signal. The optical indicator assembly may be incorporated into the second connector assembly and may be configured to provide a visual indicator concerning a characteristic of the coupling of the second socket assembly and the second connector assembly in response to receiving the at least a portion of the first optical signal.

The details of one or more implementations are set forth in the accompanying drawings and the description below. Other features and advantages will become apparent from the description, the drawings, and the claims.

BRIEF DESCRIPTION OF THE DRAWINGS

FIGS. 2a & 2b are diagrammatic views of various embodiments of the optical interface identification system of FIG. 1;

FIGS. 3A, 3B & 3C are diagrammatic views of other embodiments of the optical interface identification system of FIG. 1;

DETAILED DESCRIPTION OF THE PREFERRED EMBODIMENTS

Figure 1:
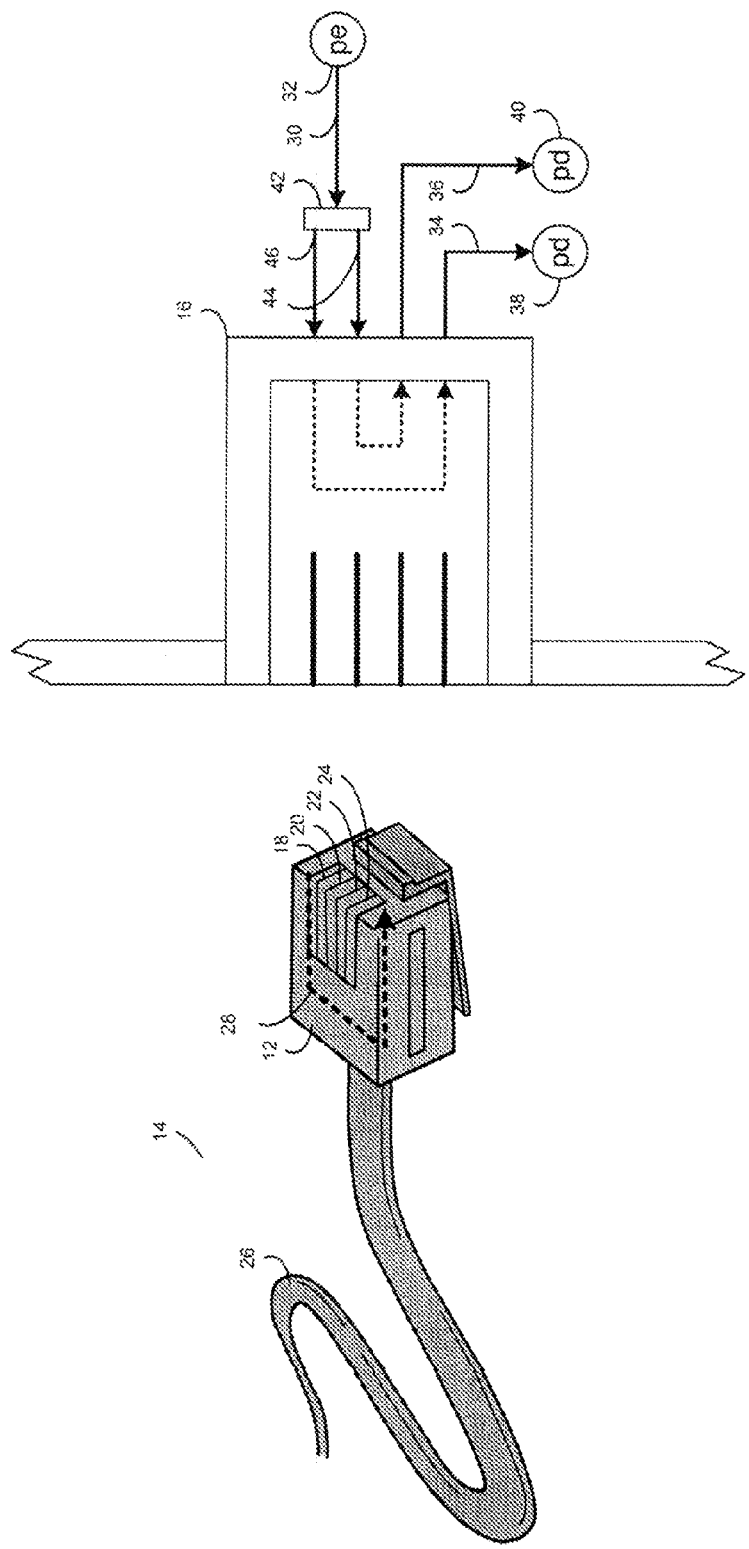
FIG. 1 is a diagrammatic view of a cable assembly including an optical interface identification system and a socket assembly.

Referring to FIG. 1, there is shown an optical interface identification system 10 that may be incorporated into connector assembly 12 of cable assembly 14. Connector assembly 12 may be configured to releasably couple socket assembly 16, thus allowing for connector assembly 12 to be quickly connected to and removed from socket assembly 16.

Examples of connector assembly 12 may includes RJ11 assemblies, RJ45 assemblies, Centronics printer assemblies, DB9 assemblies, and DB25 assemblies. Examples of cable assembly 14 may include telephone cables, network cables, printer cables, serial data cables, and USB (i.e., universal serial bus) cables. Socket assembly 16 may be incorporated into: modems, network interface cards, I/O cards, printing devices, and scanning devices, for example.

Connector assembly 12 may include one or more conductors 18, 20, 22, 24 that are typically coupled to one or more conductors (not shown) within conductor assembly 26. An example of conductor assembly 26 includes a multi-conductor wire bundle. Conductors 18, 20, 22, 24 may be electrical conductors or optical conductors. An example of electrical conductors includes copper pins (e.g., conductors 18, 20, 22, 24) within connector assembly 12, which are electrically coupled to copper wires (not shown) within conductor assembly 26. An example of optical conductors includes optical couplings (not shown) within connector assembly 12, which are optically coupled to fiber-optic conductors (not shown) within conductor assembly 26.

As will be discussed below in greater detail, connector assembly 12 may include one or more optical pathways (e.g., optical pathway 28), which are configured to: receive an optical signal 30 from an optical light source (e.g., a photo emitter) 32 positioned within socket assembly 16; and provide at least a portion 34, 36 of optical signal 30 to an optical light target (e.g., a photo detector) 38, 40 (respectively) positioned within socket assembly 16.

Optical signal 30 may be split (using optical signal splitter 42) into a plurality of optical signals (e.g., optical signals 44, 46), each of which is provided to socket assembly 16. Photo emitter 32, photo detectors 38, 40, and/or optical signal splitter 42 may be physically located within socket assembly 16 and proximate e.g., optical pathway 28 (included within connector assembly 12) once connector assembly 12 is inserted into socket assembly 16. Alternatively, photo emitter 32, photo detectors 38, 40, and/or optical signal splitter 42 may be physically located external to socket assembly 16 and one or more optical conductors (e.g., fiber optic conductors or light pipes, for example; not shown), optically coupled to e.g., photo emitter 32 and/or photo detectors 38, 40, may be used to provide optical signals 30, 44, 46 to socket assembly 16 and receive optical signals 34, 36 from socket assembly 16.

Socket assembly 16 may be capable of releasably engaging connector assembly 12, and connector assembly 12 may include one of a plurality of possible optical pathways. Referring also to FIGS. 2A & 2B, there is shown two embodiments 12', 12"of connector assembly 12, each of which include a uniquely-positioned optical pathway. For example, connector assembly 12' is shown to include optical pathway 28' and connector assembly 12" is shown to include optical pathway 28".

When connector assembly 12' is releasably coupled to socket assembly 16, optical signal 44 is routed to photo detector 40 (in the form of optical signal 36). Further, optical signal 46 is blocked (i.e., attenuated) by connector assembly 12'.

When connector assembly 12" is releasably coupled to socket assembly 16, optical signal 46 is routed to photo detector 38 (in the form of optical signal 34). Further, optical signal 44 is blocked (i.e., attenuated) by connector assembly 12'.

The output signals of photo detectors 38, 40 may be provided as input signals to circuitry and/or software (not shown) that allows for the determination of a connection type and/or a connection characteristic. Examples of connection characteristics include: the status of the connection (e.g., connected, disconnected, or partially connected); number of conductors; potential of signals; encoding type; scrambling type; encryption type; optical wavelength; power; signal configuration; signal power; signal-to-noise ratio; and optical signal strength, for example). For example and as discussed above, a standard RJ45 connector assembly may be used for both computer wiring and telephone wiring. Accordingly, when e.g., connecting computer and phone equipment within a new office space, several cable assemblies (each terminating in RJ45 connector assemblies) may be present in the room and in need of being connected to either the phone system or the computer system. By using two different types of RJ45 connectors assemblies, namely one type of connector assembly (e.g., connector assembly 12') for use with telephone systems and another type of connector assembly (e.g., connector assembly 12") for use with computer systems, the wiring process is simplified. For example, if all telephone wiring includes connector assembly 12' and all computer wiring includes connector assembly 12", upon inserting the connector assembly into socket 16, the connector assembly type may be determined.

For example, when connecting the telephone wiring to the telephone, connector assembly 12' is expected to be inserted into socket assembly 16. Therefore, photo detector 40 should receive optical signal 36. Accordingly, photo detector 40 should provide an output signal to the circuitry and/or software (not shown), which provides an indication to the person wiring the telephone that the telephone is wired properly. This indication may be in the form of an LED (i.e., light emitting diode) signal or an on-screen indicator, for example. In the event that photo detector 40 does not detect optical signal 36 and/or optical signal 34 is detected by photodetector 38, an indication may be provided to the person wiring the telephone that the telephone is not wired properly. This indication may also be in the form of an LED (i.e., light emitting diode) signal, an on-screen indicator, or a log file stored within internal memory, for example.

Accordingly, through the use of connector assemblies that include unique optical pathways (e.g., optical pathway 28' versus optical pathway 28"), the integrity and accuracy of a wiring connection may be determined.

Referring also to FIGS. 3A, 3B & 3C, the optical pathways within a connector assembly may be configured in various ways. For example, while optical pathways 28', 28" are shown to span from one side of the connector assembly to another side of the connector assembly, other configurations are possible. For example, connector assemblies may be constructed in which an optical pathway 80 spans from an upper surface of the connector assembly to a lower surface of the connector assembly. Additionally, connector assemblies may be constructed that include a plurality of optical pathways (e.g., optical pathways 82, 84). When a connector assembly includes a plurality of optical pathways, each pathway may be provided with an optical signal from a common photo emitter or may be provided with unique optical signals from a plurality of photo emitters. Further, a connector assembly may be constructed in which an optical pathway 86 spans between a left face and right face of the connector assembly.

Figure 4B:
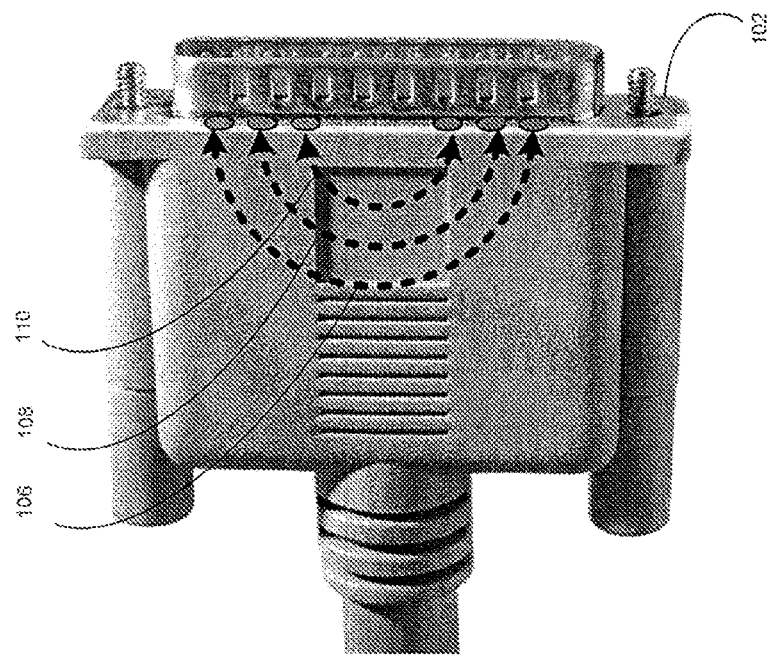
FIGS. 4A & 4B are diagrammatic views of other embodiments of the optical interface identification system of FIG. 1.
Figure 4A:
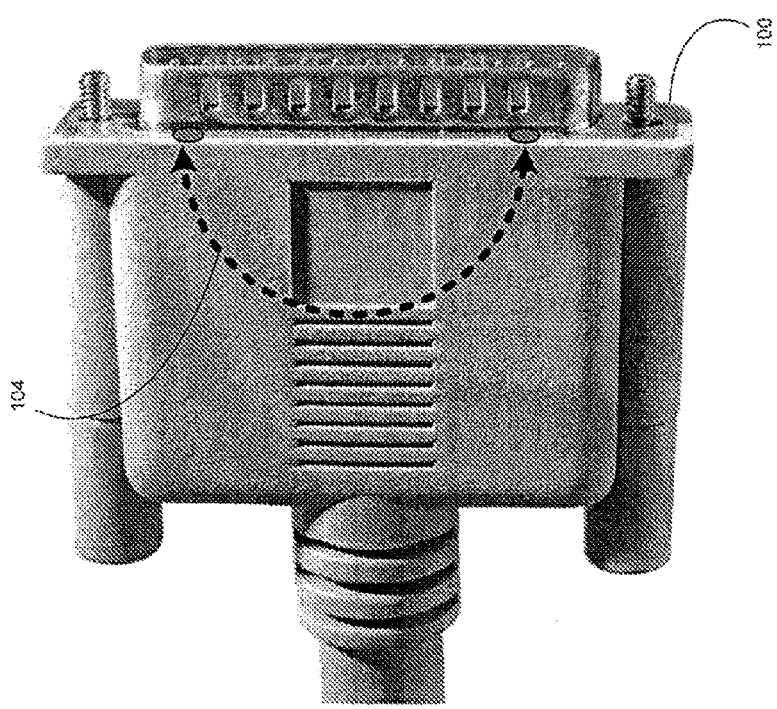

While the above-described system is shown to be implemented in an RJ11/RJ45 type connector assembly, other configurations are possible. For example and referring also to FIGS. 4A & 4B, optical pathways may be incorporated into other types of connector assemblies, such as DB25 connector assemblies 100, 102, which may include a single optical pathway 104 (included within connector assembly 100) or a plurality of optical pathways 106, 108, 110 (included within connector assembly 102).

The above-described optical pathways (e.g., optical pathways 28, 28', 28", 104, 106, 108, 110) may be implemented in various ways. For example, an optical pathway may be constructed using an optical fiber or an optical fiber bundle. Alternatively, a light pipe assembly may be used.

Figure 5B:
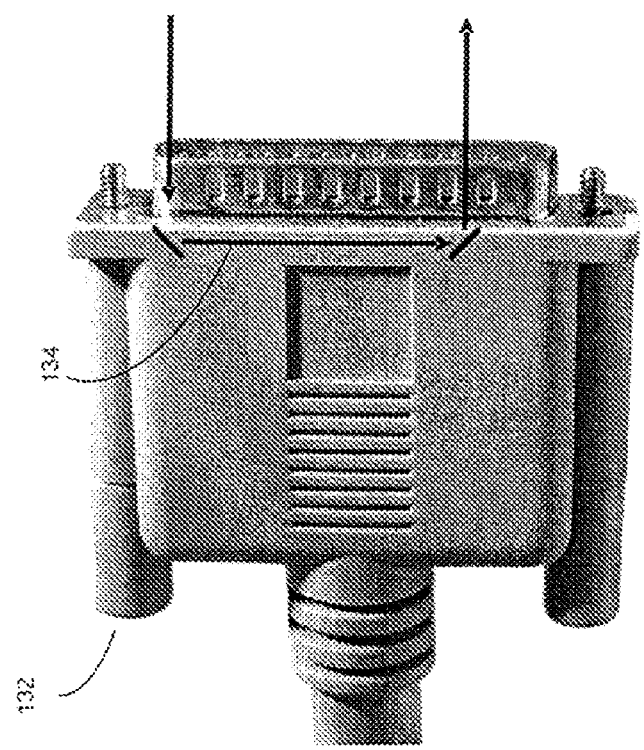
FIGS. 5A & 5B are diagrammatic views of other embodiments of the optical interface identification system of FIG. 1.
Figure 5A:
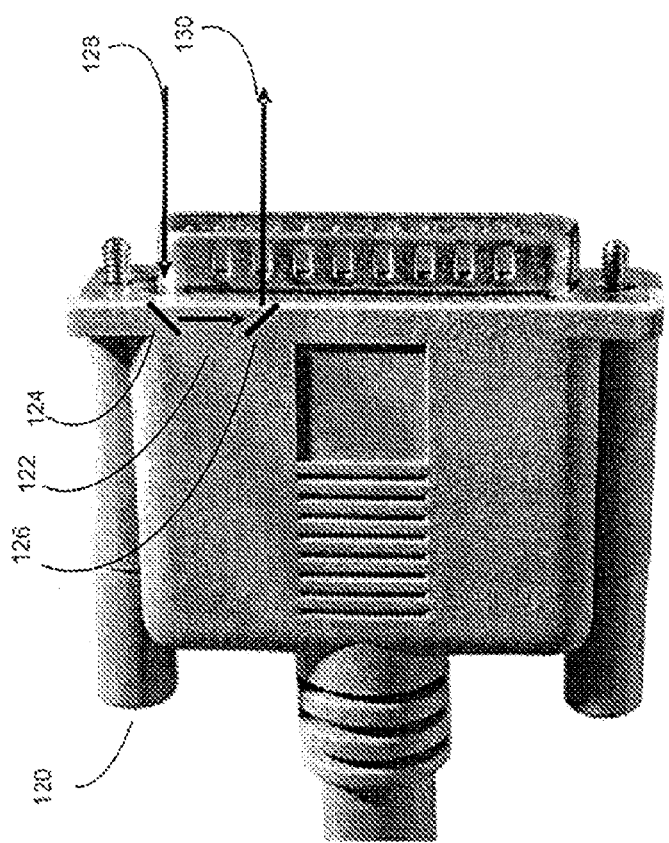

Referring also to FIGS. 5A & 5B, a reflective optical pathway is illustrated. For example, connector assembly 120 may include reflective optical pathway 122, which includes one or more reflective elements (e.g., mirrors) 124, 126 positioned to receive optical signal 128 and reflect back at least a portion of that optical signal (in the form of reflected optical signal 130). Connector assembly 132 is shown to include an alternatively-positioned reflective optical pathway 134. Additionally, optical pathways may be formed by combining reflective elements (e.g., elements 124, 126) and the above-described optical fibers/light pipes. Additional, one or more refractive devices (e.g., a prism or a lens) may be used to refract the optical signals.

Figure 6:
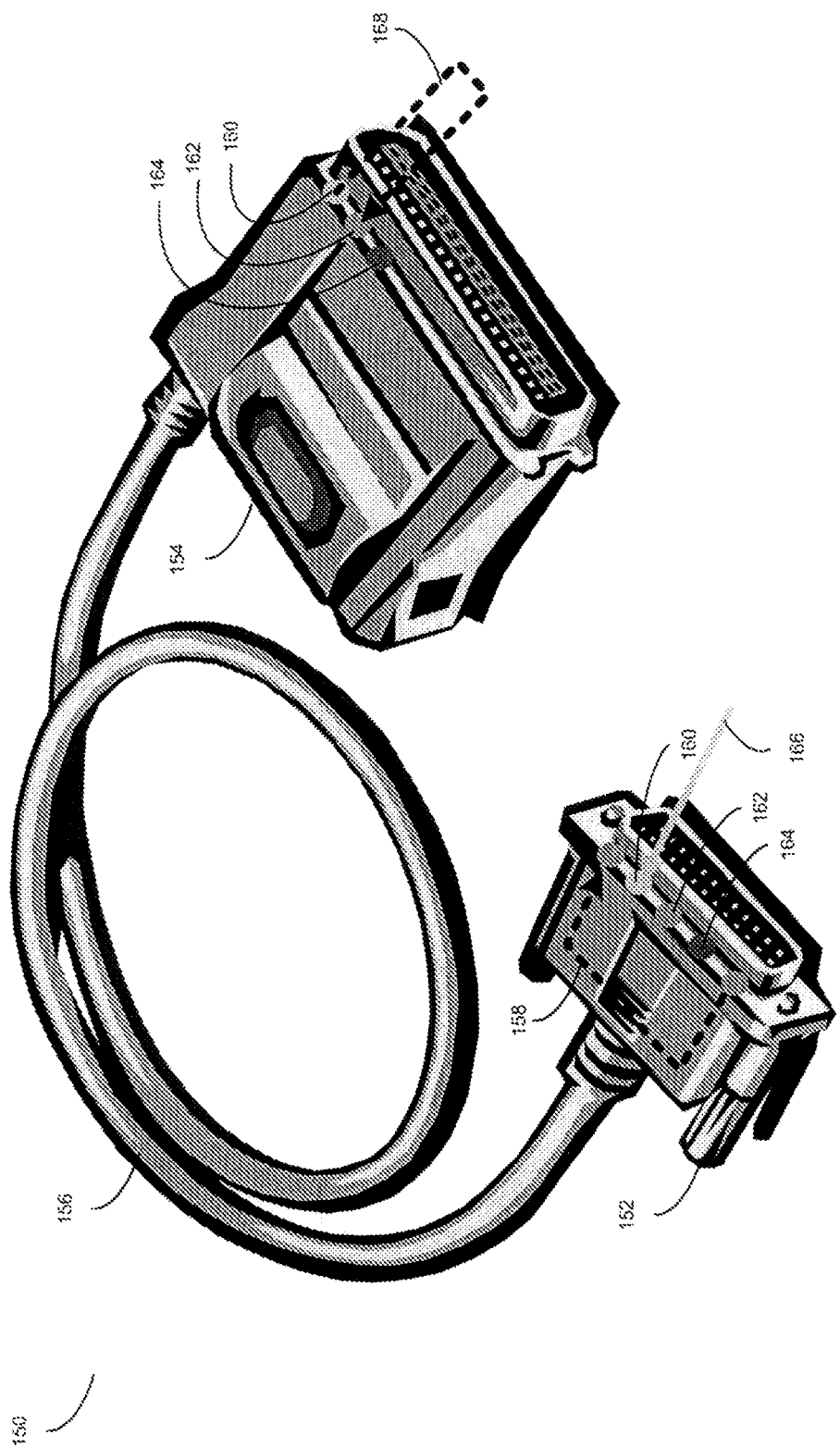
FIG. 6 is a diagrammatic view of a cable assembly including the optical interface identification system of FIG. 1.

Referring also to FIG. 6, there is shown a cable assembly 150 that includes a pair of connector assemblies 152, 154 and a conductor assembly 156. As discussed above, optical pathway 158 may provide an indication (to a user) concerning the connection type and/or connection characteristic of connector assembly 152. Additionally, optical conductors 160, 162, 164 may span from connector assembly 152, through conductor assembly 156 to connector assembly 154. When connector assembly 154 is releasably coupled to a socket assembly (not shown), though the use of optical pathways (not shown) within the socket assembly (not shown), a optical signal 166 present within e.g., optical conductor 160 may be provided to e.g., optical conductor 162 (via optical pathway 168) and routed back to the socket assembly (not shown) to which connector assembly 152 is releasably coupled. As with optical pathway 158, optical pathway 168 may provide an indication (to a user) concerning the connection type and/or connection characteristic of connector assembly 154.

Figure 7:
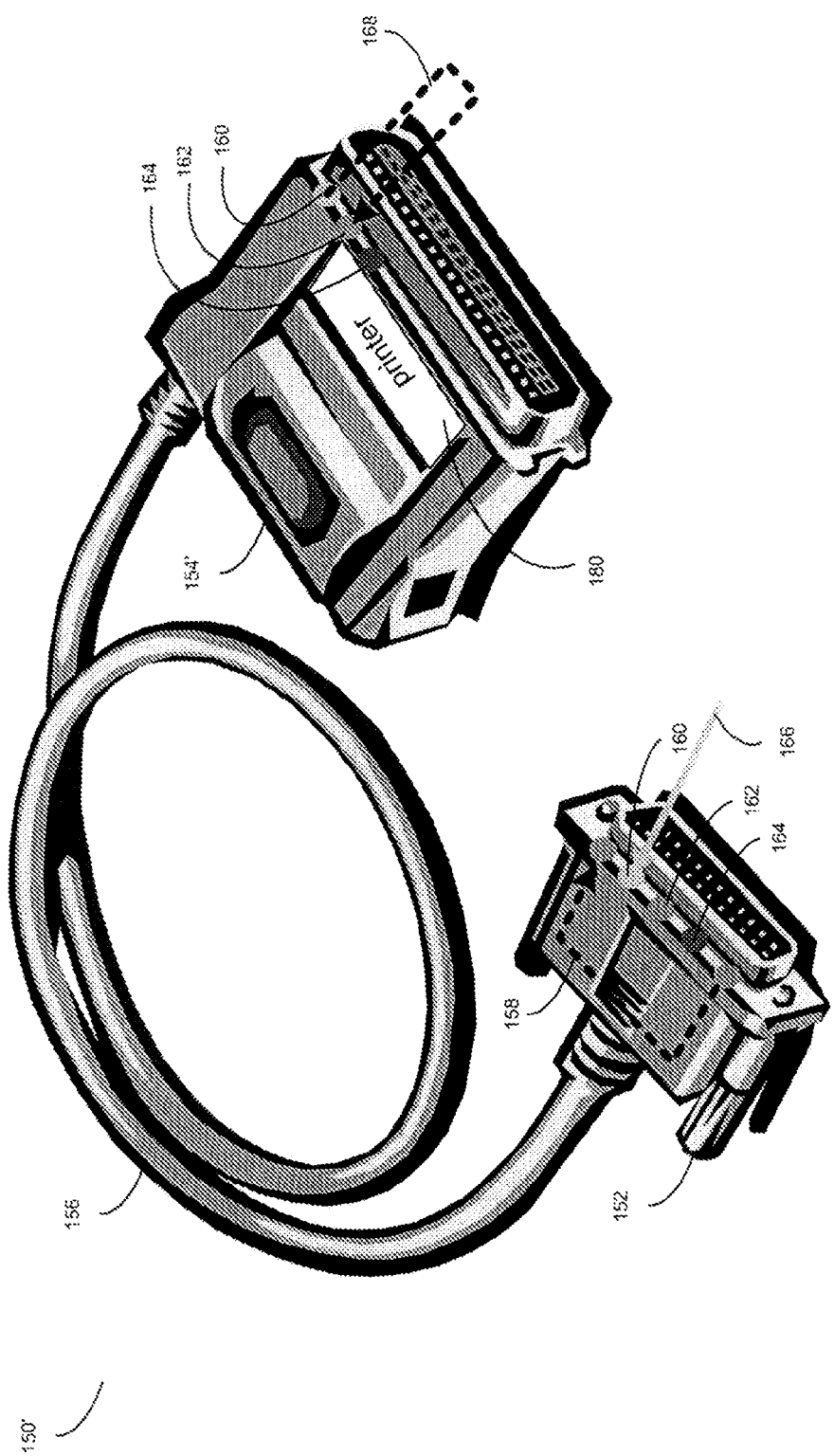
FIG. 7 is a diagrammatic view of another cable assembly including the optical interface identification system of FIG. 1 and an optical indicator assembly.

Referring also to FIG. 7, there is shown an alternative embodiment cable assembly 150' (similar to that of cable assembly 150) that includes a pair of connector assemblies 152, 154' and a conductor assembly 156. In this illustrated embodiment, connector assembly 154' includes an optical indicator assembly 180 for indicating the connection type and/or connection characteristic of connector assembly 154'. Examples of optical indicator assembly 180 may include the end of a light pipe, the end of an optical fiber, or a passive display panel that is illuminated by the end of an optical fiber or the end of a light pipe.

Optical indicator assembly 180 may be configured to define the type of device to which connector assembly 154' is releasably coupled. For example, assume that when optical conductor 160 is optically coupled (via optical pathway 168) to optical conductor 162, connector assembly 154' is releasably coupled to a printer. Accordingly, optical conductor 162 may include an optical signal splitter (not shown) that directs a portion of the optical signal being returned to connector assembly 152 (via optical conductor 162) to optical indicator assembly 180. This portion of the optical signal provided to optical indicator assembly 180 may result in optical indicator assembly 180 being illuminated. As shown in FIG. 7, optical indicator assembly 180 may include text (e.g., "printer"), which is illuminated by the portion of the optical signal directed to optical indicator assembly 180. Additionally, an optical indicator assembly (not shown) may be included within connector assembly 152 and configured to direct a portion of the optical signal passing through optical pathway 158 to the optical indicator assembly, thus indicating the connection type and/or connection characteristic of connector assembly 152.

Figure 8:
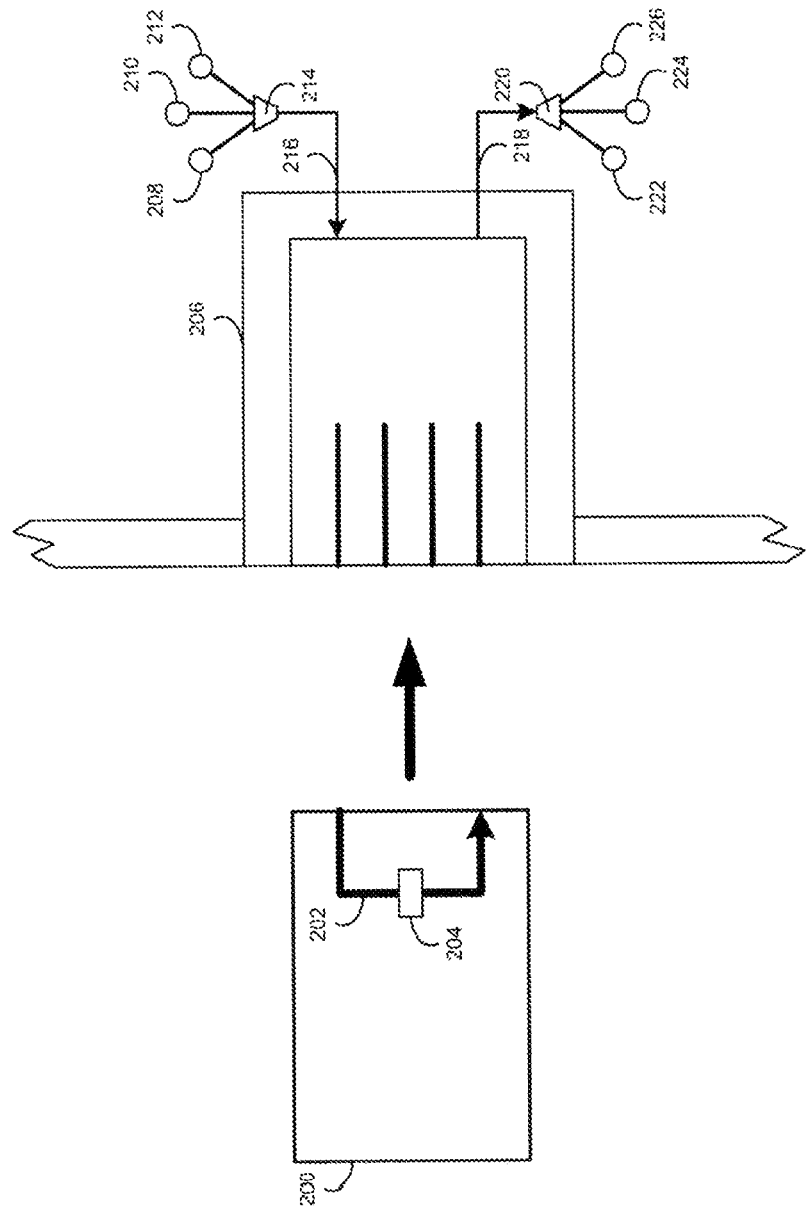
FIG. 8 is a diagrammatic view of another embodiment of the optical interface identification system of FIG. 1.

Through the use optical filtering, a single optical pathway may be used to define multiple connection types/characteristics. Referring also to FIG. 8, there is a shown a connector assembly 200 that includes an optical pathway 202 having an optical filter 204. Optical filters may be capable of selectively modifying signals in various ways, such as specific wavelength filters, polarization filters, diffraction filters, and attenuation filters, for example. Accordingly, optical filter 204 may be configured to allow a certain wavelength of light pass through the filter, while filtering out other wavelengths. For example, assume that optical filter 204 is configured to allow only blue light to pass through it, while blocking all other wavelengths of light within the optical spectrum. Alternatively, optical filter 204 may be configured to only allow infrared light to pass through it, while blocking visible and ultraviolet light.

Socket assembly 206 may include a plurality of photo emitters 208, 210, 212, each of which produces an optical signal at a different wavelength. For example, assume that photo emitter 208 produces a red optical signal, photo emitter 210 produces a blue optical signal, and photo emitter 212 produces a green optical signal. The resulting optical signals may be combined (e.g., by passive optical star technology 214) to form a composite optical signal 216. Upon receiving optical signal 216, optical filer 204 of optical pathway 202 may filter all but one of the three optical signals. For example, assume that optical filter 204 is configured to allow blue optical signals to pass, while filtering red and green optical signals. Accordingly, filtered optical signal 218 will only contain a blue optical signal (i.e., produced by photo emitter 210).

Upon receiving filtered optical signal 218, an optical signal splitter 220 may split filtered optical signal 218 into e.g., three separate optical signals, the first of which is provided to a red light photodetector 222, the second of which is provided to a blue light photo detector 224, and the third of which is provided to a green light photo detector 226. As (in this example), optical filter 204 only allows for the passage of a blue optical signal, only blue light photo detector 224 will detect a signal. Accordingly, by varying the type of optical filter included within a connector assembly, a single optical pathway may be used to define a plurality of connection types/characteristics.

As described above, the term "light" broadly refers to nominally any type of radiation, including electromagnetic (EM) radiation in or out of what is commonly considered to be the visible spectrum. This term may thus include EM radiation in the infra-red (IR) and/or ultra-violet (UV) ranges, or beyond. Further and as described above, the term "passive" refers to a construction that does not require external electric power to operate, but rather, is powered solely by light incident thereon or passing therethrough, and as may be further defined herein.

The embodiments described above demonstrate that the teachings thereof are applicable to a wide variety of plug assembly types. Examples of such plug assemblies include, but are not limited to: RJ-XX (e.g., RJ21, RJ45, RJ28, RJ11); MJ; MMJ keyed; Compu-shield™; Krone™; Dsub (e.g., D9, D15, D25, D37, D50); Hybrids; Leaf style (e.g., Centronics™, USB, PCMCIA, Infiniband/10GigEnet); and Fiber receptacle assemblies (e.g., MTRJ, LC, SC, ST, FDDI).

While the system is described above as using a stand-alone photo emitter (e.g., photo emitter 32 of FIG. 1) and a stand-alone photo detector (e.g., photo detector 38 or 40 of FIG. 1), other configurations are possible. For example, if cable assembly 14 is a fiber optic cable assembly, the socket assemblies for use with cable assembly 14 will include photo emitters and photo detectors for use when transmitting and receiving data. Accordingly, the socket assembly may be configured to temporarily use one or more of the data photo emitters and data photo detectors to determine the connection type/characteristic concerning the socket assembly/connector assembly pair.

For example, for the first 500 milliseconds that the connection assembly is inserted into the socket assembly, one or more of the data photo emitters may generate the optical signal (e.g., optical signal 30 of FIG. 1) and one or more of the data photo detectors may detect the received optical signal (e.g., optical signals 34 or 36 of FIG. 1).

Alternatively, data may be transmitted and received in a first wavelength (e.g., blue light) and the connection type/characteristic detection process may utilize a different wavelength (e.g., red light). Accordingly, by utilizing photo detectors that are capable of processing multiple wavelengths of light (as described above), the connection type/characteristic detection process may be performed regardless of whether data is being transferred.

A number of implementations have been described. Nevertheless, it will be understood that various modifications may be made. Accordingly, other implementations are within the scope of the following claims.

What is claimed is:

1. A socket assembly comprising:
   zero or more data conductors;
   one or more optical light sources, associated with the socket assembly, configured to emit at least a portion of an optical signal to an optical pathway included within a connector assembly, wherein the optical pathway is independent of the zero or more data conductors; and
   one or more optical light targets, associated with the socket assembly, configured to receive at least a portion of the optical signal from the optical pathway included within the connector assembly.

2. The socket assembly of claim 1 wherein the one or more optical light sources are a photo emitter.

3. The socket assembly of claim 1 wherein the one or more optical light targets are a photo detector.

4. The socket assembly of claim 1 wherein the one or more optical light targets are an optical conductor, and wherein the optical conductor is optically-coupled to a photo detector.

5. The socket assembly of claim 1 wherein at least one of the zero or more data conductors is an electrical data conductor.

6. The socket assembly of claim 1 wherein at least one of the zero or more data conductors is an optical data conductor.

7. The socket assembly of claim 1 wherein the optical signal includes optical energy within a defined optical spectrum, the optical pathway including an optical filter for filtering a portion of the defined optical spectrum.

8. The socket assembly of claim 1 wherein the connector assembly further comprises one or more additional optical pathways, wherein each additional optical pathway is configured to:
   receive at least a portion of the optical signal from the one or more optical light sources associated with the socket assembly; and
   provide at least a portion of the optical signal to the one or more optical light targets associated with the socket assembly.

9. The socket assembly of claim 1 wherein the optical pathway includes at least one optical conductor.

10. The socket assembly of claim 1 wherein the optical pathway includes at least one optical reflector.

11. The socket assembly of claim 1 further comprising:
an optical indicator assembly;
wherein the optical pathway is further configured to provide at least a portion of the optical signal to the optical indicator assembly; and
wherein the optical indicator assembly is configured to provide a visual indicator concerning a characteristic of the coupling of the socket assembly and the connector assembly in response to receiving the at least a portion of the optical signal.

12. The socket assembly of claim 2 wherein the one or more optical light sources include an optical conductor.

13. The socket assembly of claim 2 wherein the one or more optical light sources include an optical reflector.

14. The socket assembly of claim 2 wherein the one or more optical light sources include an optical filter.

15. The socket assembly of claim 3 wherein the one or more optical light targets include an optical conductor.

16. The socket assembly of claim 3 wherein the one or more optical light targets include an optical reflector.

17. The socket assembly of claim 3 wherein the one or more optical light targets include an optical filter.

18. The socket assembly of claim 1 wherein the optical pathway includes at least one optical splitter.

19. A method comprising:
emitting at least a portion of an optical signal by one or more optical light sources associated with a socket assembly, the optical signal configured to be received by one or more optical pathways included within a connector assembly, wherein the one or more optical pathways are independent of any data conductors;
receiving at least a portion of the optical signal from the one or more optical pathways by one or more optical light targets associated with the socket assembly; and
determining a connection based, at least in part, on at least a portion of the optical signal received by the one or more optical light targets.

20. The method of claim 19 wherein the connection includes a connection type.

21. The method of claim 19 wherein the connection includes a connection characteristic.

* * * * *